(12) United States Patent
Li et al.

(10) Patent No.: US 10,498,225 B2
(45) Date of Patent: Dec. 3, 2019

(54) DUAL-RECTIFICATION FULL BRIDGE INTERLEAVED SINGLE STAGE PFC CONVERTER CIRCUIT AND CONTROL METHODS THEREOF

(71) Applicant: SHANGHAI TUITUO TECHNOLOGY CO., LTD, Shanghai (CN)

(72) Inventors: Renhong Li, Shanghai (CN); Zhuo Shen, Shanghai (CN)

(73) Assignee: SHANGHAI TUITUO TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/393,308

(22) Filed: Apr. 24, 2019

(65) Prior Publication Data

US 2019/0326811 A1 Oct. 24, 2019

(30) Foreign Application Priority Data

Apr. 24, 2018 (CN) .......................... 2018 1 0370623

(51) Int. Cl.
*H02M 1/42* (2007.01)
*H02M 1/00* (2006.01)
*H02M 3/335* (2006.01)

(52) U.S. Cl.
CPC ....... *H02M 1/4241* (2013.01); *H02M 1/4258* (2013.01); *H02M 3/33569* (2013.01); *H02M 2001/0058* (2013.01)

(58) Field of Classification Search
CPC .. H02M 1/42; H02M 1/44; H02M 2001/0009; H02M 1/4208; H02M 1/4258; H02M 1/425; H02M 3/335; H02M 1/4241; H02M 3/33569; H02M 2001/0058; H02M 1/4233

See application file for complete search history.

(56) References Cited

U.S. PATENT DOCUMENTS

| 5,119,283 | A | * | 6/1992 | Steigerwald | ............ | H02M 1/10 |
| | | | | | | 323/207 |
| 5,822,198 | A | * | 10/1998 | Fraidlin | .............. | H02M 1/4258 |
| | | | | | | 363/17 |
| 9,502,996 | B2 | * | 11/2016 | Cho | ...................... | F25B 49/025 |
| 2013/0242622 | A1 | * | 9/2013 | Peng | ................. | H02M 3/33507 |
| | | | | | | 363/21.12 |
| 2015/0022163 | A1 | * | 1/2015 | Han | .................... | H02M 1/4208 |
| | | | | | | 323/205 |
| 2017/0025962 | A1 | * | 1/2017 | Davidson | ................ | H02M 1/42 |

(Continued)

FOREIGN PATENT DOCUMENTS

EP 3372441 A1 * 9/2018 .......... B60L 11/1811

*Primary Examiner* — Fred E Finch, III
*Assistant Examiner* — Rafael O. De León Domenech
(74) *Attorney, Agent, or Firm* — Muncy, Geissler, Olds & Lowe, P.C.

(57) ABSTRACT

An AC-DC converter with a dual-rectification full bridge interleaved single stage PFC circuit and its control method are disclosed. The converter uses two switching components of a full bridge converter to alternately drive two boost inductors, which eliminates the use of two boost switching components and two boost rectifiers required in a conventional interleaved boost PFC circuit, and also saves individual PWM PFC control circuit.

13 Claims, 14 Drawing Sheets

(56) References Cited

U.S. PATENT DOCUMENTS

| | | | |
|---|---|---|---|
| 2018/0212545 A1* | 7/2018 | Xu | H02M 3/1582 |
| 2018/0248495 A1* | 8/2018 | Lee | H02M 7/5387 |
| 2019/0148973 A1* | 5/2019 | Kim | H02J 7/06 |
| | | | 320/109 |

* cited by examiner

DUAL-RECTIFICATION FULL BRIDGE INTERLEAVED SINGLE STAGE PFC CONVERTER CIRCUIT AND CONTROL METHODS THEREOF

CROSS-REFERENCE TO RELATED APPLICATION

This application claims the priority of Chinese patent application number 201810370623.6, filed on Apr. 24, 2018, the entire contents of which are incorporated herein by reference.

TECHNICAL FIELD

The present invention relates to an AC-DC converter with a dual-rectification full bridge interleaved single stage power factor correction (PFC) circuit and its control methods.

BACKGROUND

Electrical equipment or appliance connected to AC power grid line should satisfy current harmonic standard IEC61000-3-2. As shown in FIG. 1, With regard to different equipment or applications, IEC61000-3-2 has correspondingly set different current harmonic limits, among which, a Class A limit is for normal electrical equipment, Class B for portable tools and non-professional welding equipment, Class C for lighting equipment, and Class D for portable personal computer, monitor and TV.

Existing switching mode power supply technology, ranging from media power to high power, widely uses interleaved boost circuit to realize power factor correction in combination with full bridge circuit to realize DC-DC conversion.

As FIG. 1 shows, conventional AC-DC power supply comprises an AC-DC rectification circuit, a boost PFC converter and a DC-DC converter.

As FIG. 2 shows, interleaved boost circuit and full bridge DC-DC converter operate independently, and are controlled and driven by individual PWM controllers. In FIG. 2, first boost switching component Q1, inductor L1, diode D2, capacitors C1 and C2 construct a first boost circuit; second switching component Q2, inductor L2, diode D3, capacitors C1 and C2 construct a second boost circuit. The operating principal is as follows:

1) Q1 turns on: rectified input voltage on C2 applied on L1, energy stored in L1;
2) Q1 turns off: induced voltage on L1 and voltage on C2 superimpose to charge C1, voltage on C1 always higher than input instant voltage, so first boost circuit operates.
3) Q2 turns on: rectified input voltage on C2 applied on L2, energy stored in L2;
4) Q2 turns off: induced voltage on L2 and voltage on C2 superimpose to charge C1, so second boost circuit operates.

Q1 and Q2 conduct alternately. Such two interleaved boost circuits driven by Q1 and Q2, not only increase output power, but also reduce the ripple voltage at their output. The duty of Q1 and Q2, is controlled by PWM controller which senses and feedbacks PFC output (C1 voltage, normally design to 380V~400V), and then generates 2 channels of PWM driving signal by conventional automatic control theory.

The above conventional boost circuit is capable of realizing power factor correction, to meet IEC61000-3-2 requirements, but it has the following demerits:

1. Need an individual PWM control circuit to improve power factor.
2. Need individual power supply circuits for PFC and PWM control circuits.
3. Need independent boost switching components (FETs and diodes) and PFC current sensing resistor R1.
4. Need PCB space, which is difficult in compact mechanical and layout design.
5. More components count, high cost.
6. Boost switching components Q1 and Q2 operate at hard switching mode, results in high loss, poor EMI noise.

SUMMARY OF THE INVENTION

The invention discloses a dual-rectification full bridge interleaved single stage PFC converter and its control method. It improves efficiency and noise, saves space and cost, becomes an effective solution to compact, low cost, high efficiency, low loss AC-DC converter with power factor correction function.

The dual-rectification full bridge interleaved single stage PFC converter circuit comprises: a first input rectification circuit, a second input rectification circuit, a storage capacitor, a boost capacitor, an interleaved boost converter, and a full bridge DC-DC converter, wherein the first input rectification circuit rectifies an input voltage and forms a first input rectification loop with the storage capacitor to charge the storage capacitor; the second input rectification circuit rectifies the input voltage and forms a second input rectification loop with the boost capacitor to charge the boost capacitor; one node of the storage capacitor, one node of the boost capacitor and an output of the first input rectification circuit are connected together at a same polarity;

wherein the full bridge DC-DC converter comprises: a first bridge arm including a first switching component and a second switching component; a second bridge arm including a third switching component and a fourth switching component; a main transformer including at least one primary winding and at least one secondary winding, the at least one primary winding driven by the first bridge arm and the second bridge arm, the at least one secondary winding delivering power energy to an output load through a secondary rectification and filter circuit; and a feedback control and driving unit that drives the first switching component, the second switching component, the third switching component and the fourth switching component, wherein the feedback and driving control unit senses and feedbacks an output of the full bridge DC-DC converter, generates a chopping signal to control the first through fourth switching components' conduction and cut-off by comparing with a setting value and according to automatic control theory, so as to control an output voltage, or output current, or output power of the full bridge DC-DC converter;

wherein the interleaved boost converter comprises the boost capacitor and a boost circuit, the boost circuit comprising a first inductor, a second inductor, the first switching component, the second switching component, the third switching component and the fourth switching component;

wherein during conduction of the first switching component, the first inductor, the boost capacitor and the first switching component form a first boost loop that charges the first inductor with energy stored in the boost capacitor; and during cut-off of the first switching component, the first inductor, the boost capacitor, the second switching component and the storage capacitor form a second boost loop that charges the storage capacitor through a superimposed voltage of an induced voltage on the first inductor and a voltage on the boost capacitor;

wherein during conduction of the third switching component, the second inductor, the boost capacitor and the third switching component form a third boost loop that charges the second inductor with energy stored in the boost capacitor; and during cut-off of the third switching component, the second inductor, the boost capacitor, the fourth switching component and the storage capacitor form a fourth boost loop that charges the storage capacitor through a superimposed voltage of an induced voltage on the second inductor and the voltage on the boost capacitor;

wherein during conduction of the first switching component, the superimposed voltage which serves as a boost voltage charges the primary winding of the main transformer to form a first DC-DC loop; and during conduction of the third switching component, the superimposed voltage which serves as the boost voltage charges the primary winding of the main transformer to form a second DC-DC loop;

wherein the first switching component and the third switching component alternately conduct.

Optionally, the first inductor and the second inductor operate at discontinuous current mode; when the first or second inductor's current is discharged to zero, a resonant loop comprising the storage capacitor, the boost capacitor, the first or second inductor, and the second or fourth switching component which is in a turn-on state, generates a resonant current; upon turn-off of the second or fourth switching component, the resonant current changes direction to discharge a parasitic capacitor of the first or third switching component until a zero voltage is substantially reached, to enable the first or third switching component to achieve zero voltage switching (ZVS) at a subsequent turn-on.

Optionally, the boost capacitor comprises a first boost capacitor and a second boost capacitor; the dual-rectification full bridge interleaved single stage PFC converter further comprises a third rectification circuit which rectifies an AC input voltage, and forms together with the second boost capacitor a third input rectification loop to charge the second boost capacitor; the second input rectification circuit and the first boost capacitor form the second input rectification loop to charge the first capacitor.

Optionally, the dual-rectification full bridge interleaved single stage PFC converter circuit further comprises: an impedance circuit coupled in series to the first input rectification loop, to limit an input inrush current upon turn-on of power supply, the impedance circuit neither coupled to the second input rectification loop, nor coupled to the first, second, third or fourth boost loop.

The present invention further provides a PFWM control method for the above dual-rectification full bridge interleaved single stage PFC converter circuit, comprising:

sensing and feedbacking an output parameter among voltage, current or power of a full bridge DC-DC converter, comparing the output parameter to a setting value and calculating a frequency of a PFM chopping signal according to a feedback automatic control theory;

obtaining a predetermined operating duty that ensures complete magnetic reset of a boost inductor at certain input AC peak voltage condition; and combining the frequency of the PFM chopping signal and the predetermined operating duty to form at least a pair of complementary PFWM driving signals, the PFWM driving signals configured to drive a first through a fourth switching components of the full bridge DC-DC converter, so as to adjust an output voltage of an interleaved boost converter by the frequency and adjust an output of the full bridge DC-DC converter according to the predetermined duty.

The present invention further provides a PFWM control method for the above dual-rectification full bridge interleaved single stage PFC converter circuit, comprising:

sensing and feedbacking a first output parameter among voltage, current or power of an interleaved boost convertor, comparing the first output parameter to a first setting value and obtaining a frequency of a PFM chopping signal according to a feedback control theory;

sensing and feedbacking a second output parameter among voltage, current or power of a full bridge DC-DC converter, comparing the second output parameter to a second setting value and obtaining a duty of a PWM chopping signal according to an automatic control theory;

obtaining a predetermined duty according to the obtained duty of the PWM chopping signal;

combining the obtained frequency of the PFM chopping signal and the predetermined duty of the PWM chopping signal to form at least a pair of complementary PFWM driving signals, the PFWM driving signals configured to drive a first through a fourth switching components of the full bridge DC-DC converter, so as to adjust an output of the interleaved boost converter by the frequency, and control an output of the full bridge DC-DC converter by the duty.

Optionally, the above methods may further comprise:

monitoring an input AC instant voltage and a boost output voltage, obtaining a maximum duty to prevent saturation of a first and a second inductor caused by an insufficient magnetic reset;

constraining the duty of the PFWM driving signal by selecting a smaller one of the maximum duty and the predetermined duty as an operating duty to ensure complete magnetic reset of the first and second inductors.

Optionally, the above methods may further comprise:

monitoring an input AC instant voltage, and setting a maximum operating frequency dynamically according to the input AC instant voltage.

Optionally, the above methods may further comprise:

monitoring an input AC instant voltage, forcing the interleaved boost convertor to operate at the maximum duty dynamically according to the input AC instant voltage, or simultaneously setting a minimum operating frequency.

The disclosed invention of converter comprising interleaved boost circuit, can achieve excellent active power factor correction performance. The converter takes use of two switching components of the full bridge converter to alternately drive two boost inductors, which eliminates the use of two boost switching components and two boost rectifiers required in a conventional interleaved boost PFC circuit, and saves individual PWM PFC control circuit. Furthermore, the two boost inductors are designed to operate at a discontinuous mode (DCM), which enables the four switching components of the full bridge converter to operate at zero voltage switching (ZVS) state to reduce switching loss. The dual-rectification circuit makes it possible to allocate inrush current limiter at a position that can inhibit inrush current at power supply turn-on but has no loss during the subsequent normal operation. As a result, this circuit greatly saves cost, saves space, increases efficiency and removes heat from power supply so that low cost, compact, high efficiency power supply is achieved.

LIST OF REFERENCE NUMERALS

Q1—First boost switching component (in conventional boost circuit)
Q2—Second boost switching component (in conventional boost circuit)
Q3—First switching component (in full bridge circuit)
Q4—Second switching component (in full bridge circuit)
Q5—Third switching component (in full bridge circuit)
Q6—Fourth switching component (in full bridge circuit)
D1—First rectification component
D2—Second rectification component
D3—Third rectification component
D4—Fourth rectification component
D5—Fifth rectification component
D6—Sixth rectification component
D7—Seventh rectification component
C1—Storage capacitor
C2—Boost capacitor
C3—Second boost capacitor
T1—DC-DC main transformer
Np—T1's primary winding
Ns1—T1's first secondary winding
Ns2—T1's second secondary winding
L1—First inductor, boost inductor
L2—Second inductor, boost inductor
Rth1—First impedance, input inrush current limiter
Ds1—First output rectification component
Ds2—Second output rectification component
Cs1—First output smoothing capacitor
Ls1—First output smoothing inductor
Vdc—Boost circuit output voltage, voltage on storage capacitor

DETAILED DESCRIPTION OF EXEMPLARY EMBODIMENTS

The following FIG. 3~FIG. 29 describe the detailed embodiments of the present invention.

Figure 1:
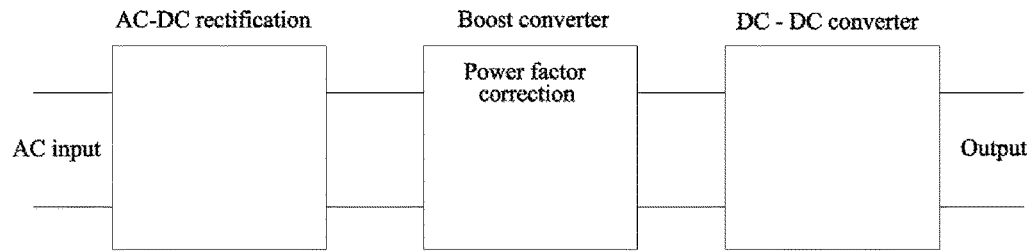
FIG. 1 is a block diagram of a converter comprising conventional interleaved PFC and full bridge DC-DC.
Figure 2:
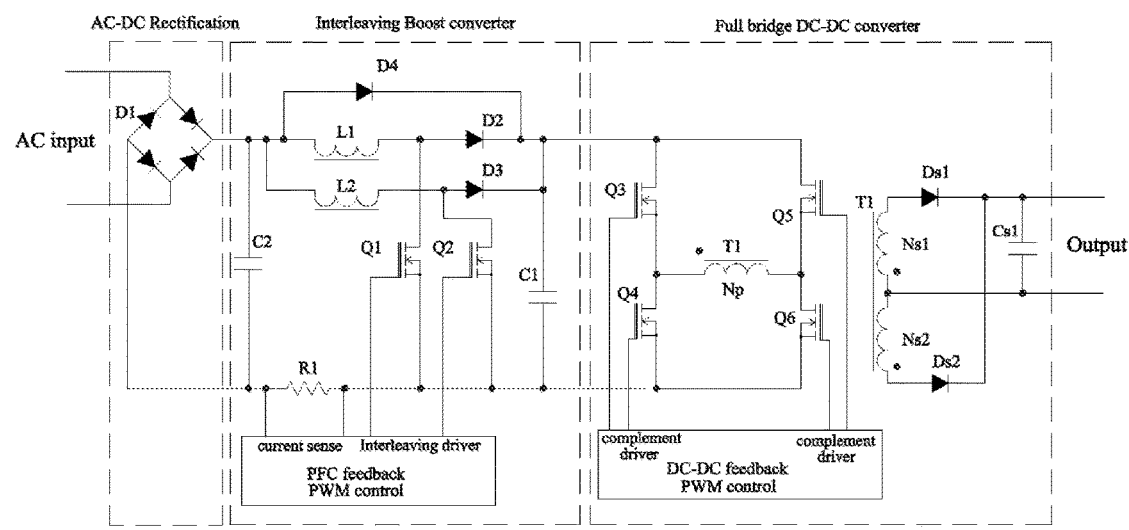
FIG. 2 shows a detailed circuit of FIG. 1.
Figure 3:
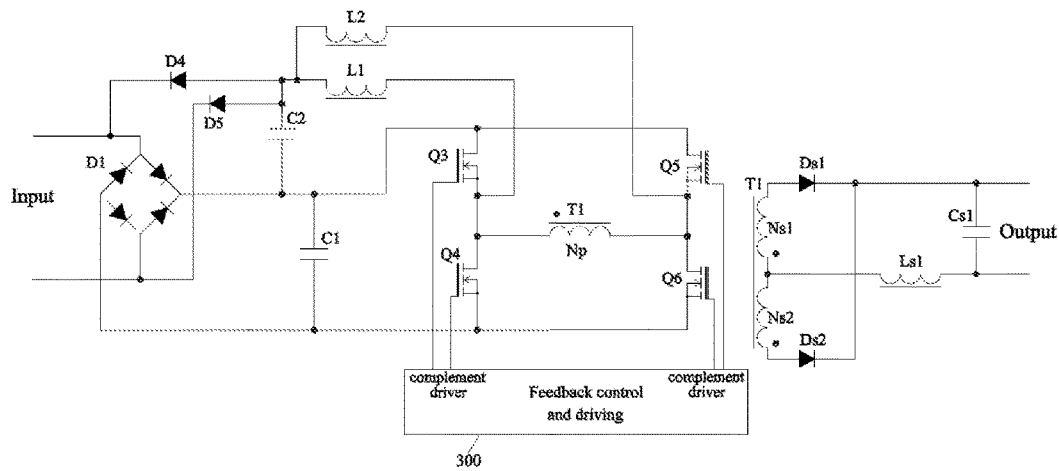
FIG. 3 is a schematic of a dual-rectification full bridge interleaved single stage PFC converter.

As FIG. 3 shows, the present invention introduces a dual-rectification full bridge converter with interleaved single stage PFC, it comprises: first input rectification circuit, second input rectification circuit, storage capacitor C1, boost capacitor C2, interleaved boost converter circuit, and full bridge DC-DC converter circuit.

First input rectification circuit contains first rectification component D1 which is a bridge diode. The first rectification component D1 rectifies input voltage and charges storage capacitor C1, to form a first input rectification loop.

Second input rectification circuit contains first rectification component D1, fourth rectification component D4 and fifth rectification component D5. The rectification components D1, D4 and D5 rectify input voltage and charge boost capacitor C2 to form a second input rectification loop.

One node of storage capacitor C1, one node of boost capacitor C2 and an output of first input rectification circuit connect at same polarity.

The full bridge DC-DC converter circuit comprises:
a first bridge arm including first switching component Q3 and second switching component Q4;
a second bridge arm including third switching component Q5 and fourth switching component Q6;
a main transformer T1 including at least one primary winding Np and at least one secondary winding Ns1, wherein the at least one primary winding is driven by first bridge arm and secondary bridge arm, and the at least one secondary winding delivers power energy to output load through a secondary rectification and filter circuit;
a feedback control and driving unit 300 for driving the first switching component, second switching component, third switching component and fourth switching component, wherein the feedback control and driving unit 300 senses and feedbacks an output of full bridge DC-DC converter, compares the sensed output to a setting value and according to automatic control theory generates a chopping signal to control the four switching components' conduction and cut-off, so as to control output voltage, or output current, or output power of full bridge DC-DC converter.

The interleaved boost converter circuit comprises: a boost capacitor C2 and a boost circuit. The boost circuit comprises first inductor L1, second inductor L2, first switching component Q3, second switching component Q4, third switching component Q5 and fourth switching component Q6.

During conduction of first switching component Q3, first inductor L1, boost capacitor C2 and first switching component Q3 form a first boost loop, energy stored in boost capacitor C2 charges the first inductor L1; during cut-off of first switching component Q3, first inductor L1, boost capacitor C2, second switching component Q4 and storage capacitor C1 form a second boost loop, induced voltage on first inductor L1 and voltage on boost capacitor C2 superimpose and charge storage capacitor C1.

During conduction of third switching component Q5, second inductor L2, boost capacitor C2 and third switching component Q5 form a third boost loop, energy stored in boost capacitor C2 charges the second inductor L2; during cut-off of third switching component Q5, second inductor L2, boost capacitor C2, fourth switching component Q6 and storage capacitor C1 form a fourth boost loop, induced voltage on second inductor L2 and voltage on boost capacitor C2 superimpose and charge storage capacitor C1.

When first switching component Q3 and fourth switching component Q6 conduct, storage capacitor C1, primary winding of main transformer Np, first switching component Q3 and fourth switching component Q5 form a first DC-DC loop; when second switching component Q4 and third switching component Q5 conduct, storage capacitor C1, primary winding of main transformer Np, second switching component Q4 and third switching component Q5 form a second DC-DC loop.

First switching component Q3 and third switching component Q5 alternately conduct.

The secondary rectification and filter circuit fully rectifies the output of full bridge DC-DC converter, and contains: at least one secondary winding, and at least one output rectification component. In the examples, two secondary windings, i.e. Ns1 and Ns2 and two output rectification components, i.e. Ds1 and Ds2 are used.

First smoothing inductor Ls1 and first smoothing capacitor Cs1 couple to the secondary rectification component to serve as output filter.

The invention introduces a dual-rectification full bridge interleaved single stage PFC power supply circuit, which comprises: two input rectification loops charging both storage capacitor C1 and boost capacitor C2, with C1 and C2 coupled at same polarity and storage capacitor C1 serving as the output capacitor of the boost circuit; first switching component Q3, second switching component Q4, third switching component Q5, fourth switching component Q6 and main transformer T1 construct full bridge DC-DC converter; and two boost inductors L1, L2 coupled to joints of two bridge arms respectively, and also coupled to boost capacitor C2. DC-DC control circuit 300 drives Q3, Q4, Q5 and Q6 to operate in states of turn-on or turn-off. First switching component Q3 and third switching component Q5 alternately drive boost inductor L1 and L2 to realize boost conversion. Q3, Q6 and Q4, Q5 construct two bridge arms to drive main transformer T1 to realize DC-DC conversion.

The principal theory to realize boost PFC is: the first switching component Q3 and third switching component Q5 in full bridge DC-DC converter also serve as switching components of interleaved boost PFC. Under control of PWM/PFM, they accomplish the driving of boost PFC power conversion as well as DC-DC full bridge power conversion.

Detailed operating sequence is as follows:

1. When first switching component Q3 and fourth switching component Q6 turn on, second switching component Q4 and third switching component Q5 cut off, first inductor L1 is charged by input rectified voltage on C2 through Q3, energy stored in L1. At same time, energy stored in second inductor L2 during previous period releases in the manner of L2's induced voltage and AC rectified voltage on C2 superimpose to charge storage capacitor C1 through fourth switching component Q6, accomplishing boost conversion; meanwhile, first switching component Q3 and fourth switching component Q6 drive main transformer T1 to deliver power energy to its DC-DC secondary side.

2. When first switching component Q3 and fourth switching component Q6 cut off, second switching component Q4 and third switching component Q5 turn on, energy stored in first inductor L1 releases, L1's induced voltage and AC rectified voltage on C2 superimpose to charge storage capacitor C1 through second switching component Q4, accomplishing boost conversion; at same time, second inductor L2 is charged by input rectified voltage on C2 through Q5, energy stored in L2; meanwhile, second switching component Q4 and third switching component Q5 drive main transformer T1 to deliver power energy to its DC-DC secondary side.

Above first switching component Q3 and third switching component Q5's duty is driven by feedback control and driving unit 300, by sensing and feedbacking DC-DC output and based on closed-loop automatic control, turns out PWM driving signal with certain duty, to control and stabilize DC-DC output. In other aspect, voltage in storage capacitor C1, as the output of boost circuit, is in proportional to duty, so when DC-DC feedback control and driving unit 300 adjusts duty to control output, it adjusts boost output voltage as well in the same direction, so that the duty control increases the gain of feedback loop, as a result, DC-DC output ripple is reduced.

For better control interleaved boost circuit and full bridge DC-DC converter, following PFWM (Pulse Frequency and Width Modulation) control method is introduced:

In full bridge DC-DC conversion, output can be expressed as a function of duty and Vdc: Vout=f(duty, Vdc), detailed formula is:

$$Vout=2*Vdc*Ns/Np*Duty,$$

where Vdc is voltage on storage capacitor C1, Ns/Np is turns ratio of main transformer T1 between secondary and primary windings.

Inferred from formula, full bridge DC-DC converter's output can be adjusted and controlled by duty of PWM and boost output voltage Vdc.

Boost output power Pout can be expressed as a function of its operating frequency and duty: Pout=f(f, duty), detailed formula is:

$$Pout=Vin \times Vdc \times Duty \times (1-Duty)/(2 \times f \times L)$$

where Pout is boost circuit average output power; Vin is instant AC voltage after rectification; L is the corresponding boost inductor L1 or L2.

According to formula, interleaved boost circuit's output power can be adjusted by operating frequency f while duty is predetermined by full bridge DC-DC, therefore Vdc can be regulated to designed setting value.

In boost circuit, first inductor L1 and second inductor L2's magnetic reset relation is: Vin*Duty=(Vdc−Vin)*(1−Duty). As can be inferred, Duty(max)=(Vdc−Vin)/Vdc is the maximum operating duty to ensure magnetic reset of L1, L2.

When Vin is at peak of sinusoid, its value is close to Vdc, therefore Duty(max) should be small enough to attain voltage*second balance to ensure magnetic reset. Once operating duty becomes larger than Duty(max), boost inductor L1 or L2 saturates, leading to damage of first switching component and second switching component.

In the present invention, feedback control and driving unit 300 has two methods of PFWM control, their features are as below:

PFWM Control Method 1:

There is a monitor module to monitor boost output voltage, obtain frequency of PFM for driving switching components according to traditional feedback control theory (open loop or closed loop), and use frequency to control boost output voltage.

There is another monitor module to monitor full bridge DC-DC output voltage or current or power, obtain duty of PWM for driving switching components according to traditional automatic control theory, and use duty to control DC-DC output voltage or current or power.

Combine above frequency and duty into at least a pair of complementary PFWM driving signals, to directly or indirectly drive full bridge DC-DC converter's switching components. PFWM driving signal can be modified by inserting delay or changing amplitude.

PFWM Control Method 2:

There is a monitor module to monitor full bridge DC-DC output voltage or current or power, obtain frequency of PFM for driving switching components according to traditional automatic control theory, and use frequency to adjust boost output which then controls DC-DC output voltage or current or power.

There is another monitor module to monitor boost circuit's parameter like input instant voltage and boost output voltage, obtain maximum duty Duty(max) of PFM to prevent boost inductors from saturation due to insufficient magnetic reset.

There is a predetermined duty according to design optimization, normally it is 50% or a bit lower. Actual operation duty is selected from a smaller one of predetermined duty and Duty(max).

Combine above frequency and duty into at least a pair of complementary PFWM driving signals, to directly or indirectly drive full bridge DC-DC converter's switching components. PFWM driving signal can be modified by inserting delay or changing amplitude according to actual design. At predetermined duty operating, frequency can be adjusted to control boost output so as to control DC-DC output.

In addition, the interleaved boost circuit of the present invention also takes use of resonance of boost current at DCM to achieve switching components' ZVS, making both interleaved boost circuit and full bridge DC-DC converter operate at soft switching mode. Taking advantage of the two input rectification structures, an inrush current limiter circuit can be allocated at the right position where it only functions at power supply turn-on and has no loss during normal operation.

First Embodiment

The power supply of first embodiment is designed in hard switching mode. As FIG. 3 shows, dual-rectification full bridge converter with interleaved single stage PFC is implemented as a combination of interleaved boost circuit and full bridge DC-DC converter. It comprises first and second input rectification circuits, storage capacitor C1, boost capacitor C2, interleaved boost converter circuit, and full bridge DC-DC converter circuit. In full bridge DC-DC converter, first switching component Q3 and second switching components Q4 are connected in series and form the first bridge arm; third switching component Q5 and fourth switching component Q6 are connected in series and form the second bridge arm. Both bridge arms are connected in parallel with storage capacitor C1. Q3, Q6 and Q4, Q5 alternately drive T1's primary winding. First inductor L1 and second inductor L2 are coupled to the center joints of first arm and second arm respectively and their other nodes coupled to boost capacitor C2 and further coupled to input terminals through input rectification diodes D4 and D5 respectively. Boost capacitor C2 and storage capacitor C1 are connected at positive or negative potential (i.e. at same polarity).

Figure 4:
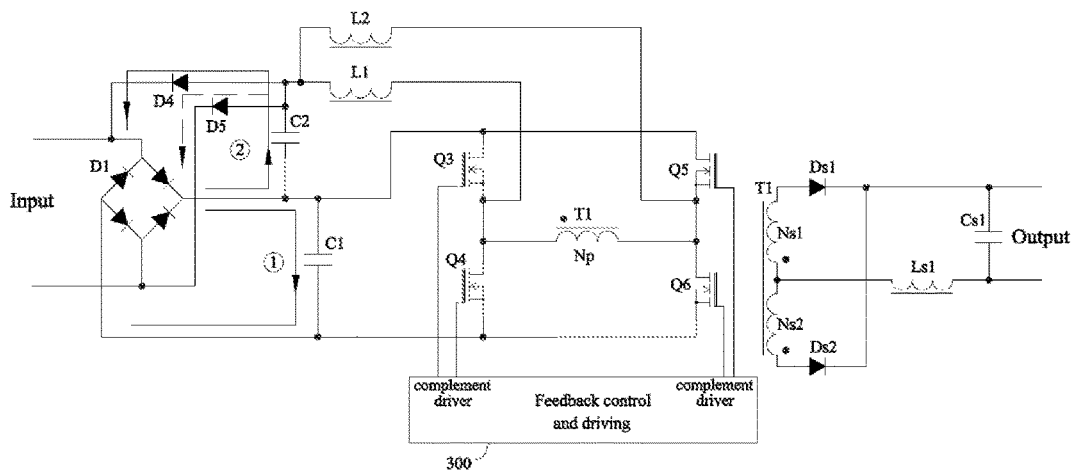
FIG. 4 and FIG. 5 are schematics of two input rectification loops in the first embodiment.

The dual-rectification full bridge interleaved single stage PFC comprises dual input rectification circuits, as show in FIG. 4: one node of storage capacitor C1, one node of boost capacitor C2 and first rectification component's positive node are coupled at same positive polarity.

1. First input rectification circuit includes first rectification component D1, which rectifies input voltage in full wave mode, and stores energy in storage capacitor C1; when boost circuit operated after power supply's turn-on, boost output voltage on C1 is always higher than instant voltage of AC input, thus AC input no longer charges C1; when boost output power is insufficient to maintain C1 voltage higher than instant AC voltage, AC input starts to charge C1 again;

2. Second input rectification circuit includes first rectification component D1 and fourth and fifth rectification components D4, D5, the rectification circuit charges boost capacitor C2; due to relatively small capacitance of C2, voltage on C2 reflects full wave rectification waveform of input AC. In active PFC (boost) circuit, boost capacitor C2 purposes for high frequency noise reduction and improvement of EMI.

Figure 5:
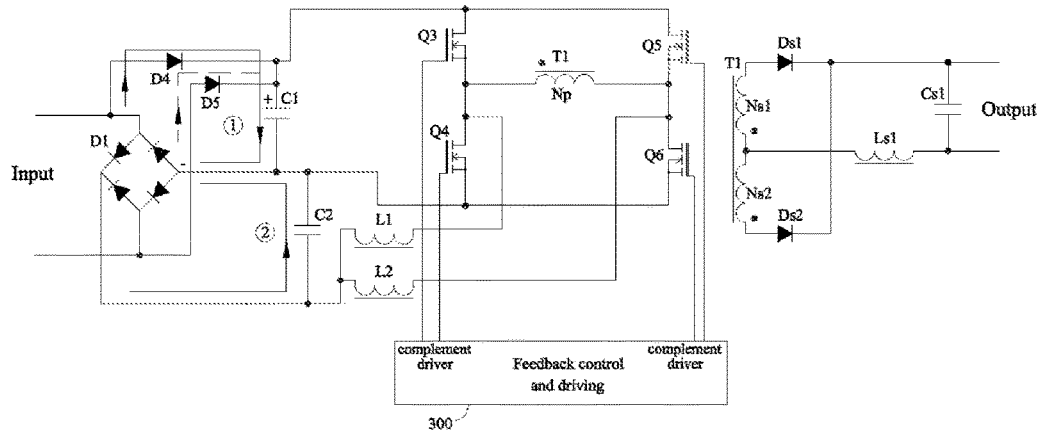

Storage capacitor C1, boost capacitor C2 and first rectification component can be designed to be coupled at same negative polarity as shown in FIG. 5, its dual rectification circuits are as below:

1. First input rectification circuit includes first rectification component D1 and fourth and fifth rectification components D4, D5, the rectification circuit charges boost capacitor C2;

2. Second input rectification circuit includes first rectification component D1, which rectifies input voltage in full wave mode, and charges storage capacitor C1;

The dual-rectification full bridge interleaved single stage PFC comprises the combination of interleaved boost circuit and full bridge DC-DC converter, and contains: primary side of main transformer T1, storage capacitor C1, first switching component Q3, second switching component Q4, third switching component Q5 and fourth switching component Q6; main transformer T1's secondary side rectification components Ds1, Ds2, smoothing capacitor Cs1 and feedback control and driving unit 300. These components construct full bridge DC-DC converter. First switching component Q3, second switching component Q4, third switching component Q5 and fourth switching component Q6, first inductor L1, second inductor L2, boost capacitor C2 and storage capacitor C1 construct interleaved boost circuit.

First inductor L1 and second inductor L2 are designed in continuous current mode (CCM), therefore, the first and third switching components operate at hard switching mode.

In the first embodiment, operation sequence is as below:

1. State 1: as shown in FIG. 6 and FIG. 7, switching components Q3, Q6 turn on, Q4, Q5 turn off.

Figure 6:
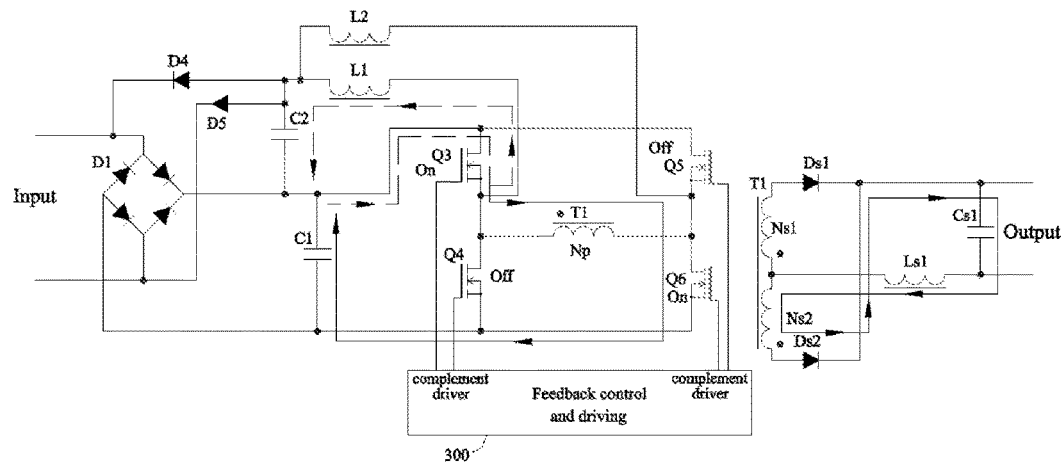
FIG. 6 is a diagram showing L1 and T1's current loop in operating state 1 of first embodiment.

In FIG. 6, voltage on storage capacitor C1 is also boost output voltage. Voltage on boost capacitor C2 reflects AC input instant voltage after rectification. When energy on C2, through switching component Q3, flows into first inductor L1 as indicated by dotted line with arrow, boost energy is stored in L1. Simultaneously, when Q3, Q6 conduct, energy in storage capacitor C1 flows in primary winding (Np) of T1 and transfers to secondary winding Ns2, delivering power energy to load through output rectification component Ds2 and filter Ls1 and Cs1.

Figure 7:
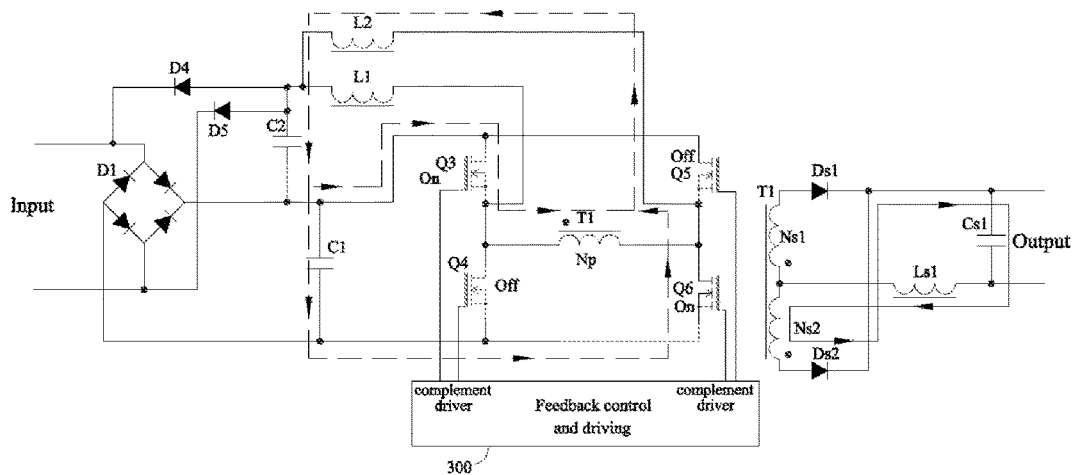
FIG. 7 is a diagram showing L2 and T1's current loop in operating state 1 of first embodiment.

As shown in FIG. 7, energy stored in second inductor L2 during previous state (state 4) generates induced voltage at the time of Q5's turn-off, such induced voltage superimposes with voltage on boost capacitor C2 to charge storage capacitor C1 through Q6, accomplishing boost conversion (dotted line). The other energy releasing loop of L2 is through Q3, flows through main transformer T1, and directly delivers to load. L2's stored energy has not been completely released when operating state returns to state 3, and it is a so called continuous current mode (CCM).

2. State 2: as shown in FIG. 8 and FIG. 9, switching components Q3, Q6 turn off, Q4, Q5 keep turn-off.

Turn-off of Q3 halts the power transfer via main transformer T1, therefore output energy is supplied to load by filter Ls1 and Cs1.

Figure 8:
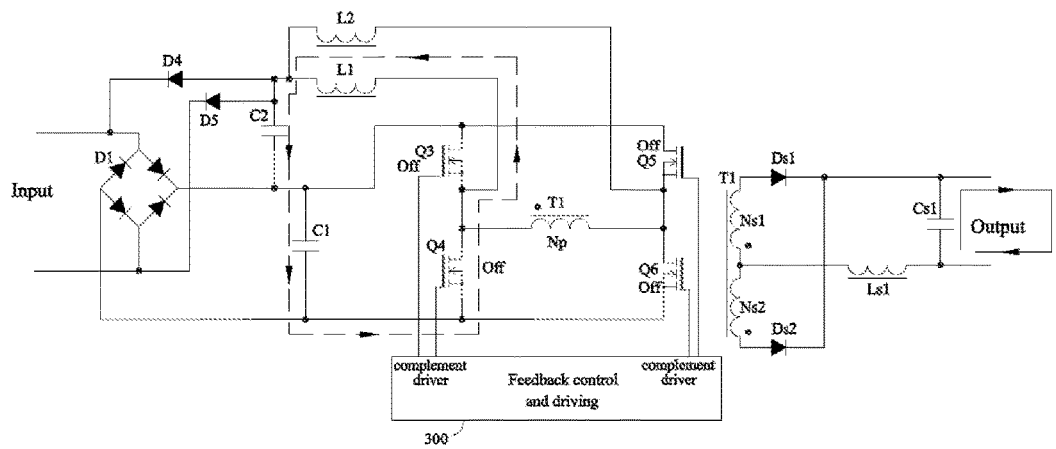
FIG. 8 is a diagram showing L1 and T1's current loop in operating state 2 of first embodiment.

As shown in FIG. 8, energy stored in first inductor L1 during previous state (state 1) generates induced voltage at the time of Q3's turn-off, induced voltage and voltage on boost capacitor C2 superimpose to charge storage capacitor C1 through Q4, accomplishing boost conversion (dotted line). L1's stored energy has not been completely released when operating state returns to state 1, and it is a so called CCM.

Figure 9:
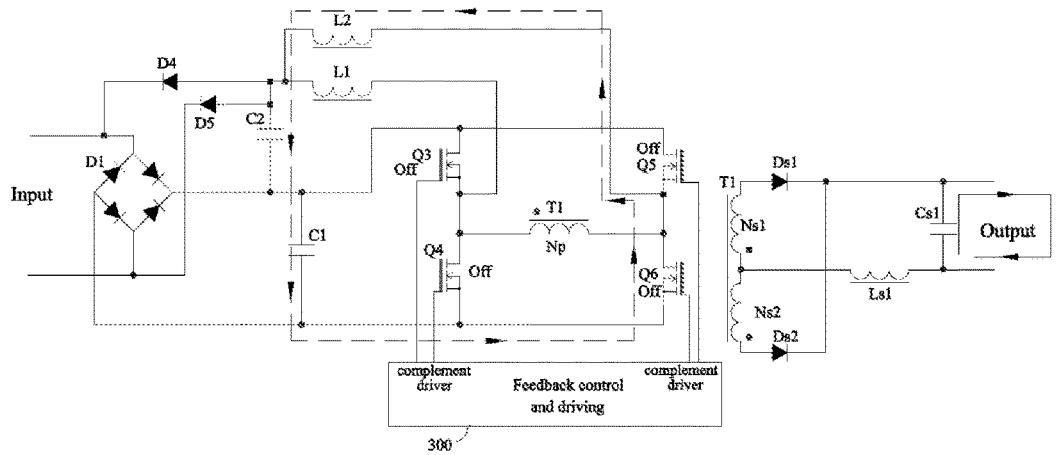
FIG. 9 is a diagram showing L2 and T1's current loop in operating state 2 of first embodiment.

As shown in FIG. 9, energy stored in second inductor L2 and voltage on boost capacitor C2 superimpose to charge storage capacitor C1 through Q6's body diode (or external diode if parallelly connected), continuing boost conversion.

3. State 3: as shown in FIG. 10 and FIG. 11, switching components Q3, Q6 keep turn-off, Q4, Q5 turn on.

Figure 10:
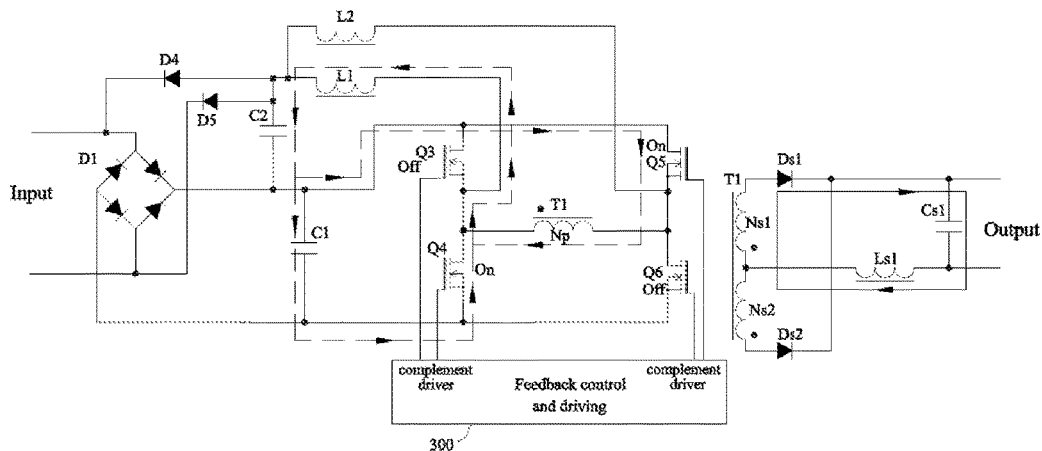
FIG. 10 is a diagram showing L1 and T1's current loop in operating state 3 of first embodiment.

In FIG. 10, energy stored in first inductor L1 and voltage on boost capacitor C2 superimpose to charge storage capacitor C1 through Q4's body diode (or external diode if parallelly connected). The other energy releasing loop of L1 is, through Q5, flows through main transformer T1, directly delivers to load. L1's stored energy has not been completely released when operating state return to state 1, and it is a continuous current mode.

Figure 11:
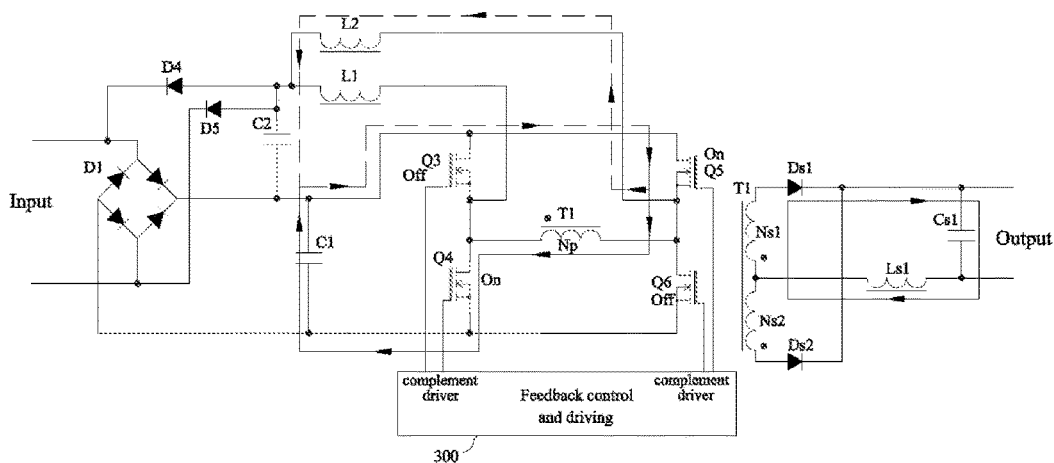
FIG. 11 is a diagram showing L2 and T1's current loop in operating state 3 of first embodiment.

As shown in FIG. 11, when Q4, Q5 conduct, energy in storage capacitor C1 flows into primary winding Np of T1 (referring to solid line for current loop) transfers to secondary winding Ns1, delivering power energy to load through output rectification component Ds1 and filter Ls1, Cs1. Simultaneously, energy on C2, through third switching component Q5, flows into first inductor L2 as indicated by dotted line with arrow, boost energy stored in L2.

4. State 4: as shown in FIG. 12 and FIG. 13, switching components Q3, Q6 keep turn-off, Q4, Q5 turn off.

Figure 12:
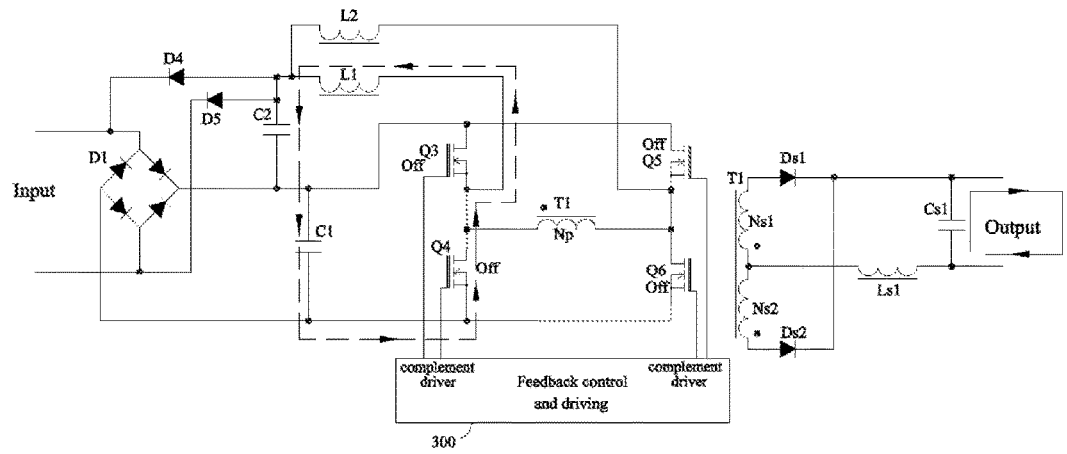
FIG. 12 is a diagram showing L1 and T1's current loop in operating state 4 of first embodiment.

As shown in FIG. 12, energy stored in first inductor L1 and voltage on boost capacitor C2 superimpose to charge storage capacitor C1 through Q4's body diode (or external diode if parallelly connected). L1's stored energy has not been completely released when operating state return to state 1, and it is a continuous current mode (CCM).

Figure 13:
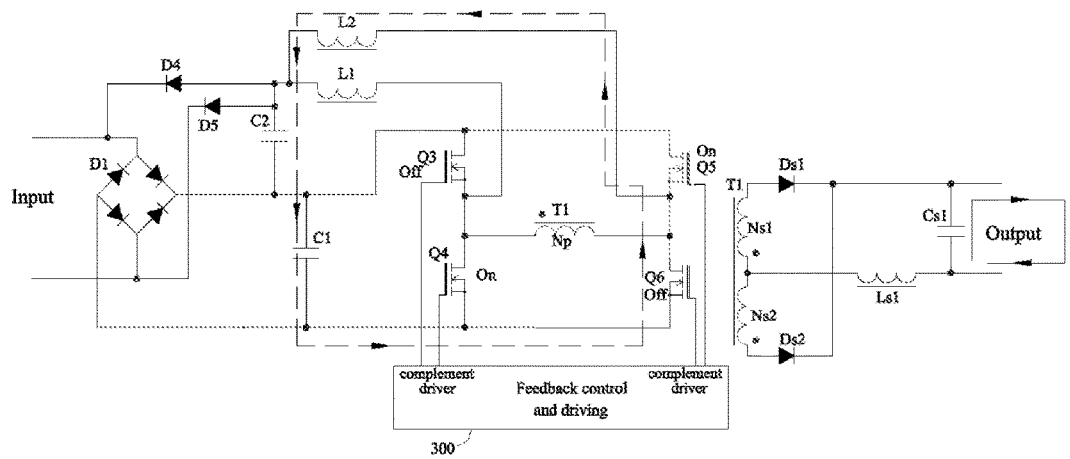
FIG. 13 is a diagram showing L2 and T1's current loop in operating state 4 of first embodiment.
Figure 14:
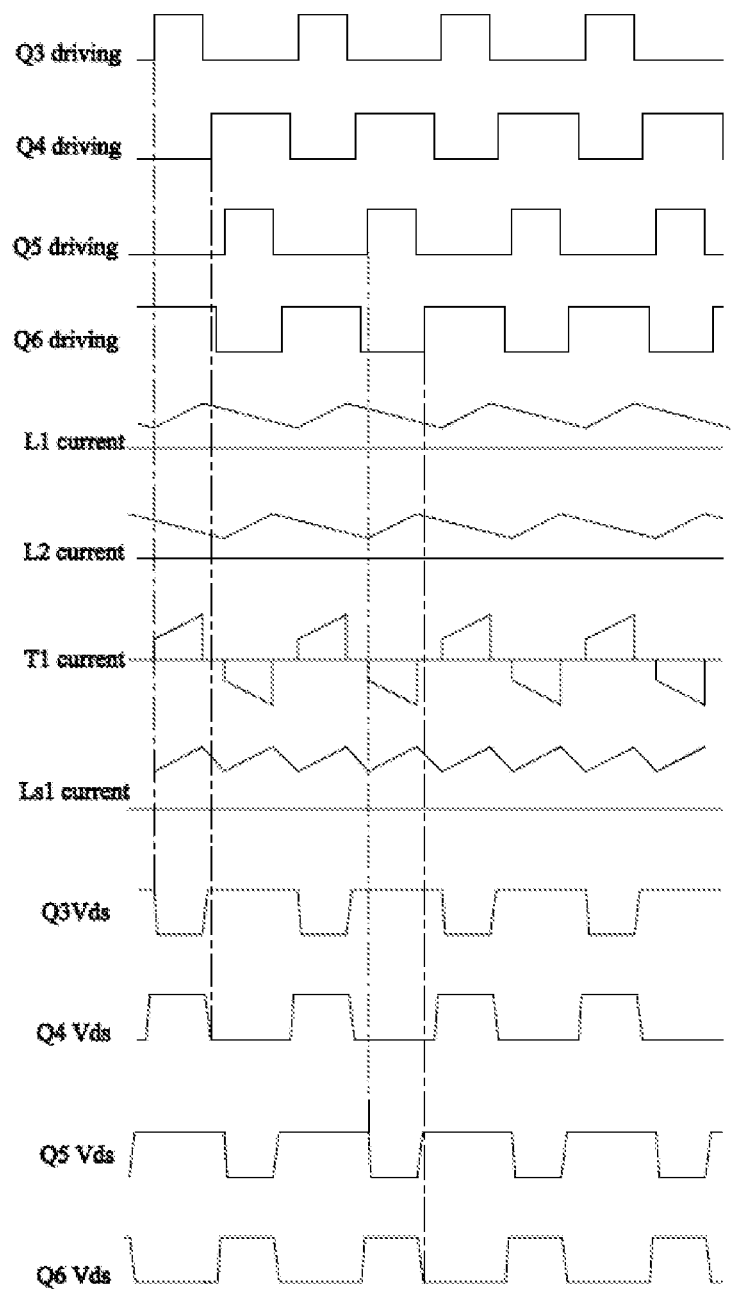
FIG. 14 is a diagram of operating waveform in the first embodiment.

As shown in FIG. 13, energy stored in first inductor L2 and voltage on boost capacitor C2 superimpose to charge storage capacitor C1 through Q6's body diode (or external diode if connected), continuing boost conversion (dotted line).

Repeating the operation periodically from state 1 to state 4, the power supply accomplishes interleaved boost conversion and full bridge DC-DC conversion so as to convey AC energy at input to isolated output load. The mass of energy conveyed is controlled by feedback control and driving unit 300.

Figure 15:
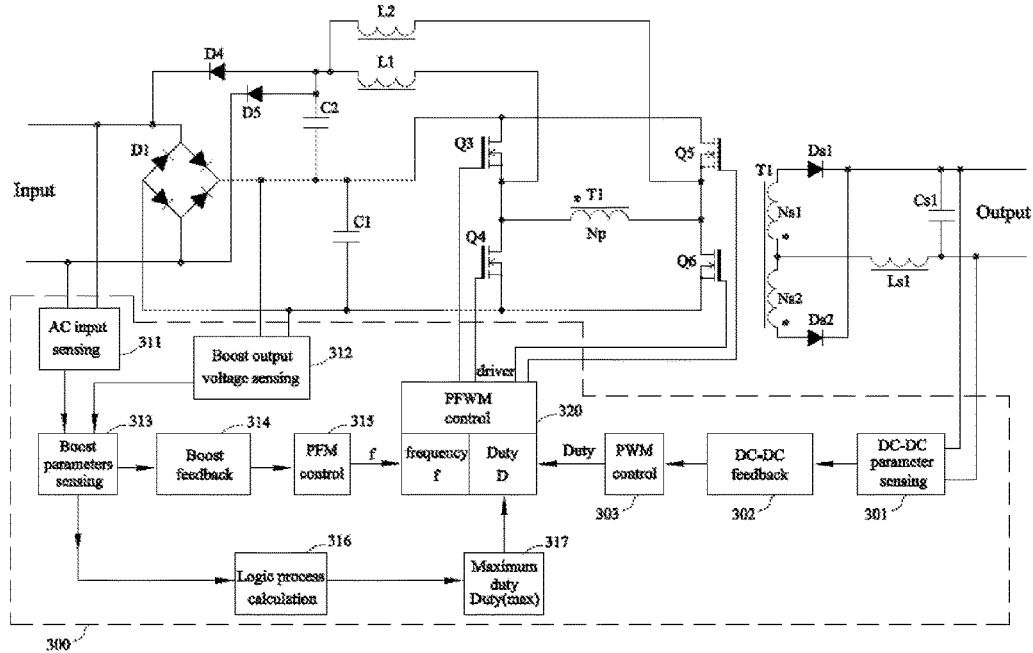
FIG. 15 is a block diagram of control method 1 in the first embodiment.

As can be seen from the waveform shown in FIG. 15, first switching component Q3 and third switching component Q5 operate at hard switching mode, both of them turn on at high Vds voltage.

In this embodiment, interleaved boost and full bridge DC-DC share common switching components Q3 and Q5, and addresses the problem that conventional PWM or PFM control method is not possible to control two conversion circuits simultaneously. In addition, first inductor L1 and second inductor L2's magnetic reset relation is: Vin*Duty=(Vdc−Vin)*(1−Duty), as can be inferred, Duty(max)=(Vdc−Vin)/Vdc which is the maximum operating duty to ensure magnetic reset of L1, L2. If the duty determined by full bridge DC-DC converter is higher than Duty(max), it results in saturation of either L1 or L2 which may damage Q3 or Q5.

The following two PFWM methods could be used to control both boost and full bridge DC-DC converter simultaneously, and also solve boost magnetic reset problem.

1. The First PFWM Control Method:

As shown in FIG. 15, monitoring boost output voltage 312 on storage capacitor C1 or together with monitoring AC input instant voltage 311, calculating the frequency of PFM 315 by conventional feedback control theory 314 in the method of open loop or closed loop to control boost circuit, and according to parameters of boost circuit 313 like boost output voltage and AC instant voltage, calculating 316 to obtain the Duty(max) 317 to prevent boost inductor from saturation; sensing 301 output voltage or current or power to calculate the PWM duty 303 of DC-DC converter according to conventional feedback automatic control theory 302. Actual operating duty is limited by Duty(max) 317. Combining operating duty and frequency into PFWM signal 320, to directly or indirectly drive full bridge DC-DC converter's switching components. PFWM driving signal 320 can be modified by inserting delay or changing amplitude. Adjusting frequency to control boost output, and changing duty to regulate full bridge DC-DC output.

Figure 16:
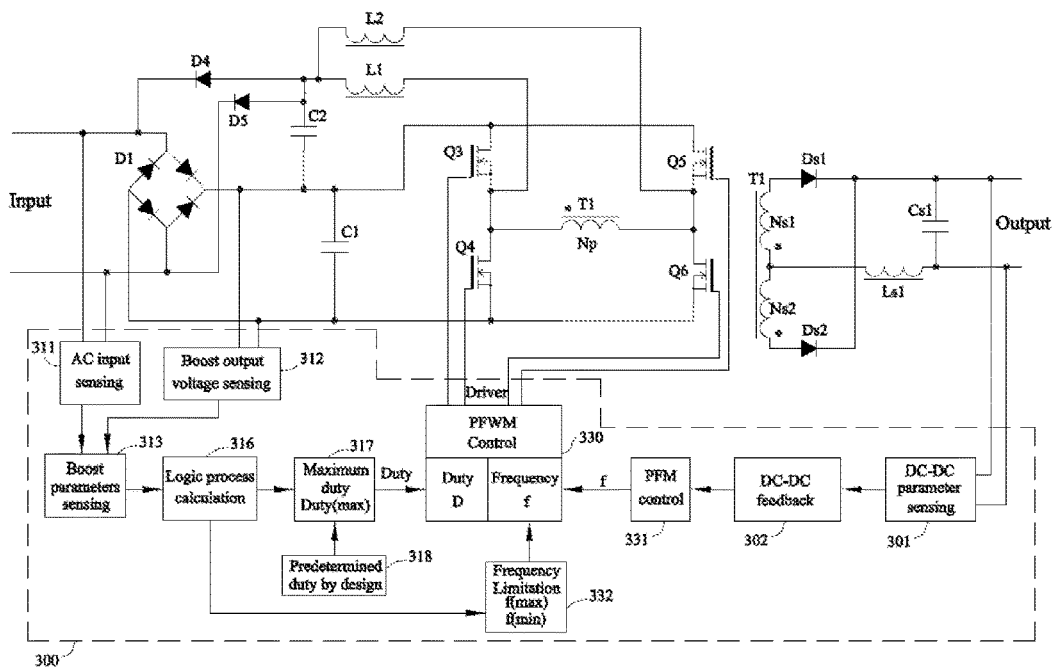
FIG. 16 is a block diagram of control method 2 in the first embodiment.

2. The Second PFWM Control Method:

As shown in FIG. 16, there is a monitor module 301 to monitor full bridge DC-DC output voltage or current or power, to obtain frequency of PFM 331 for driving switching components according to traditional feedback and automatic control 302 theory. According to boost output voltage 312 and AC instant voltage 311 etc., which are boost circuit parameters 313, obtaining the Duty(max) 317 to prevent boost inductor from saturation by logic processing or calculation 316. Predetermine duty 318 according to design optimization (normally less than 50%), and selecting the actual operating duty from predetermined duty or Duty (max) which is smaller. Combining operating duty and frequency into PFWM signal 330, to directly or indirectly drive full bridge DC-DC converter's switching components. PFWM driving signal can be modified by inserting delay or changing amplitude. The second PFWM control method uses frequency to adjust boost output at selectable duty 318, and then to control DC-DC output voltage or current or power with fixed transformer ratio and duty 318. PFM's maximum or minimum frequency limitations 332 can be optionally set for design optimization purpose.

In this embodiment, during Q3 and Q5's turn-on and cut-off, and according to AC input voltage and phase variation, interleaved boost circuit's first inductor L1, second inductor L2 and boost capacitor C2 absorb energy from AC input, making AC input current to synchronize with AC voltage and phase, as a result, power factor correction function can be achieved.

Second Embodiment

The operation introduced in second embodiment is soft switching mode. Soft switching technology takes use of resonant current to flow in switching component reversely, and discharges voltage on parasitic capacitor to near zero, so as to realize zero voltage switch-on at next conduction.

Figure 17:
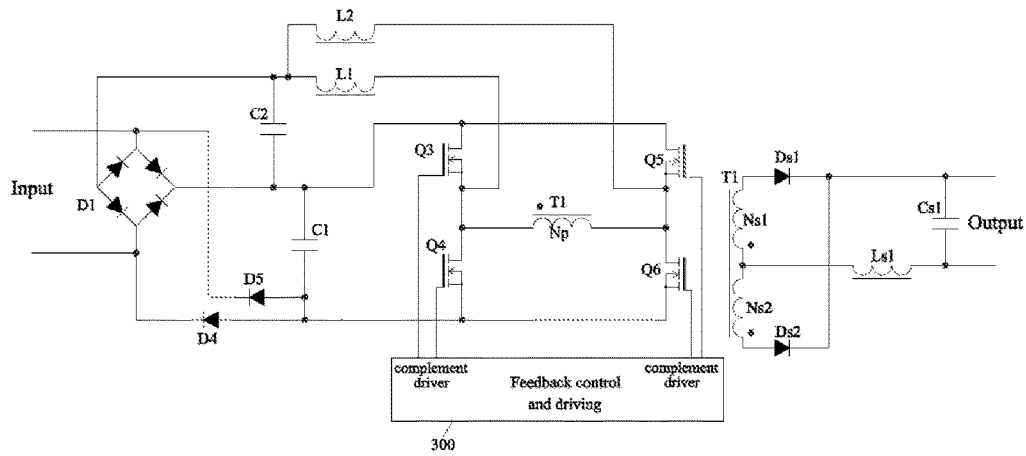
FIG. 17 is a schematic of second embodiment.

As shown in FIG. 17, difference between the second embodiment from the first embodiment is: D1, D4, D5 and storage capacitor C1 construct the first input rectification circuit. D1 and boost capacitor C2 construct the second input rectification circuit. Storage capacitor C1, boost capacitor C2 and output of first rectification circuit are coupled at their positive nodes.

Boost inductors L1 and L2 are designed at discontinuous current mode (DCM). C1, C2, L1 and on-state Q4 or Q5 construct resonant current loop, boost resonant current occurs after boost current's returning to zero at DCM, switching components Q4 or Q5's cut-off forces boost resonant current, after its returning to zero, to flow through switching components Q3 or Q5 reversely, discharging their parasitic capacitors, enabling Q3 and Q5 ZVS at subsequent switch-on.

Operating principal in this embodiment mainly differs from first embodiment is that, during the state 1 and state 3 of first embodiment, due to DCM mode, L1 and L2's stored energy are completely discharged, and boost current returns to zero; voltage Vdc on storage capacitor C1, through Q4 or Q6, charges the resonant tank which contains L1, C2 or L2, C2; when Q4 or Q6 is cut off, resonant current reversely flows through switching components Q3, Q5, and after parasitic capacitors of Q3, Q5 are fully discharged, ZVS is achieved.

The ZVS process obtained for first inductor L1 and switching components Q3, Q4 according to second embodiment is illustrated as below:

1. State 3 (same as first embodiment): as shown in FIG. 10, switching components Q3, Q6 keep turn off, Q4, Q5 turn on; first inductor L1 continues to release energy, which is accumulated with voltage on boost capacitor C2, to charge C1 through Q4; the other energy release loop is, L1's voltage and C2's voltage superimpose and pass through Q5 to transfer energy to output load via main transformer T1.

Figure 18:
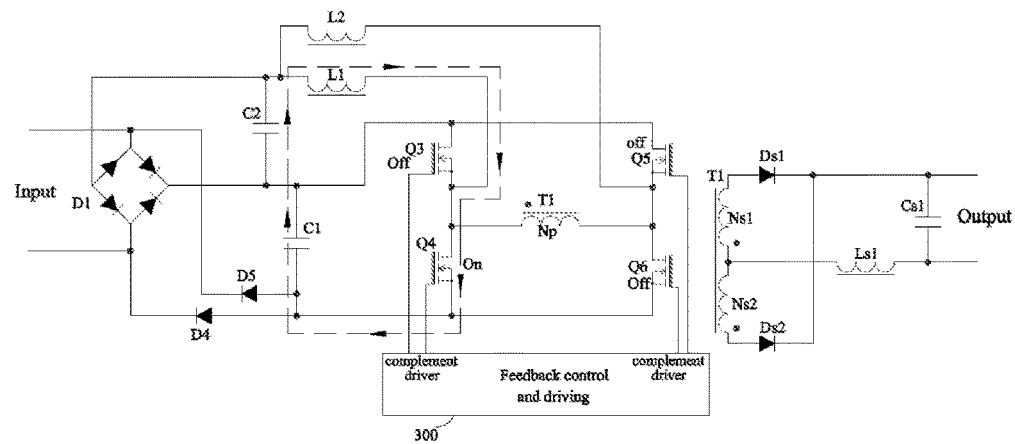
FIG. 18 is a diagram showing L1's current loop in operating state 3-1 of second embodiment.

2. State 3-1: as shown in FIG. 18, switching components Q3, Q6 keep turn-off, Q4 keeps turn-on, Q5 switches from turn-on to turn-off: first inductor L1's energy is discharged, after boost current decreases to about zero volt, Vdc on storage capacitor C1 starts to charge resonant tank of L1 and C2.

Figure 19:
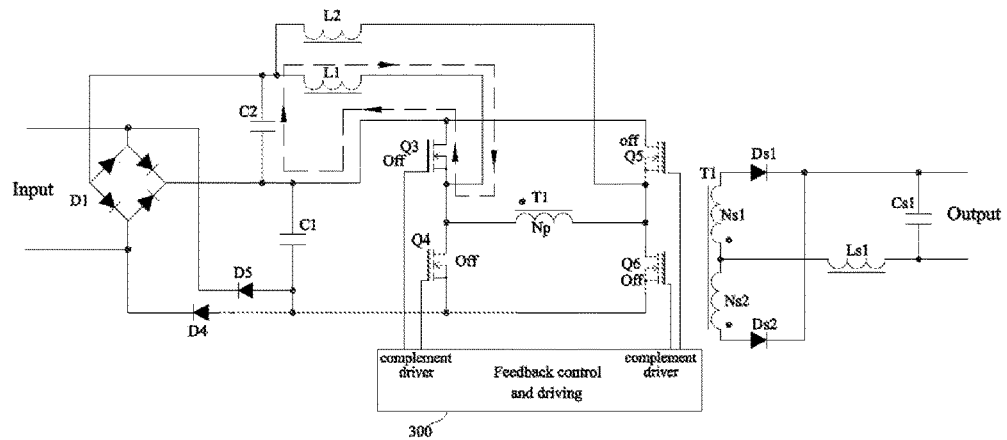
FIG. 19 is a diagram showing L1's current loop in operating state 3-2 of second embodiment.

3. State 3-2: as shown in FIG. 19, switching components Q3,Q6,Q5 keep turn-off, Q4 turns off; the turn-off of Q4, changes the direction of resonant current to pass through body diode (or external diode if necessary) after discharging parasitic capacitor of Q3 down to around zero volt, preparing for Q3's ZVS turn-on.

Optionally, the boost inductor L1, L2's current can be monitored so as to detect the timing of reaching zero current. By controlling the elapse time between the timing of reaching zero current and Q4's turn-off, efficiency could be optimized by controlling peak of resonant current effectively.

4. State 1: as shown in FIG. 6, switching components Q3, Q6 turn on, Q4, Q5 keep turn-off. Voltage on storage capacitor C1 is also boost output voltage; voltage on boost capacitor C2 reflects AC input instant voltage after rectification; when energy on C2, through switching component Q3, flows into first inductor L1, boost energy is stored in L1; simultaneously, when Q3, Q6 conduct, energy in storage capacitor C1 flows into primary winding (Np) of T1, transfers to secondary winding Ns2, delivers power energy to output load through output rectification component Ds2 and filter Ls1, Cs1.

The second inductor L2 and switching components Q5, Q6's ZVS operating sequence is symmetrically same as L1, Q3, Q4.

Figure 20:
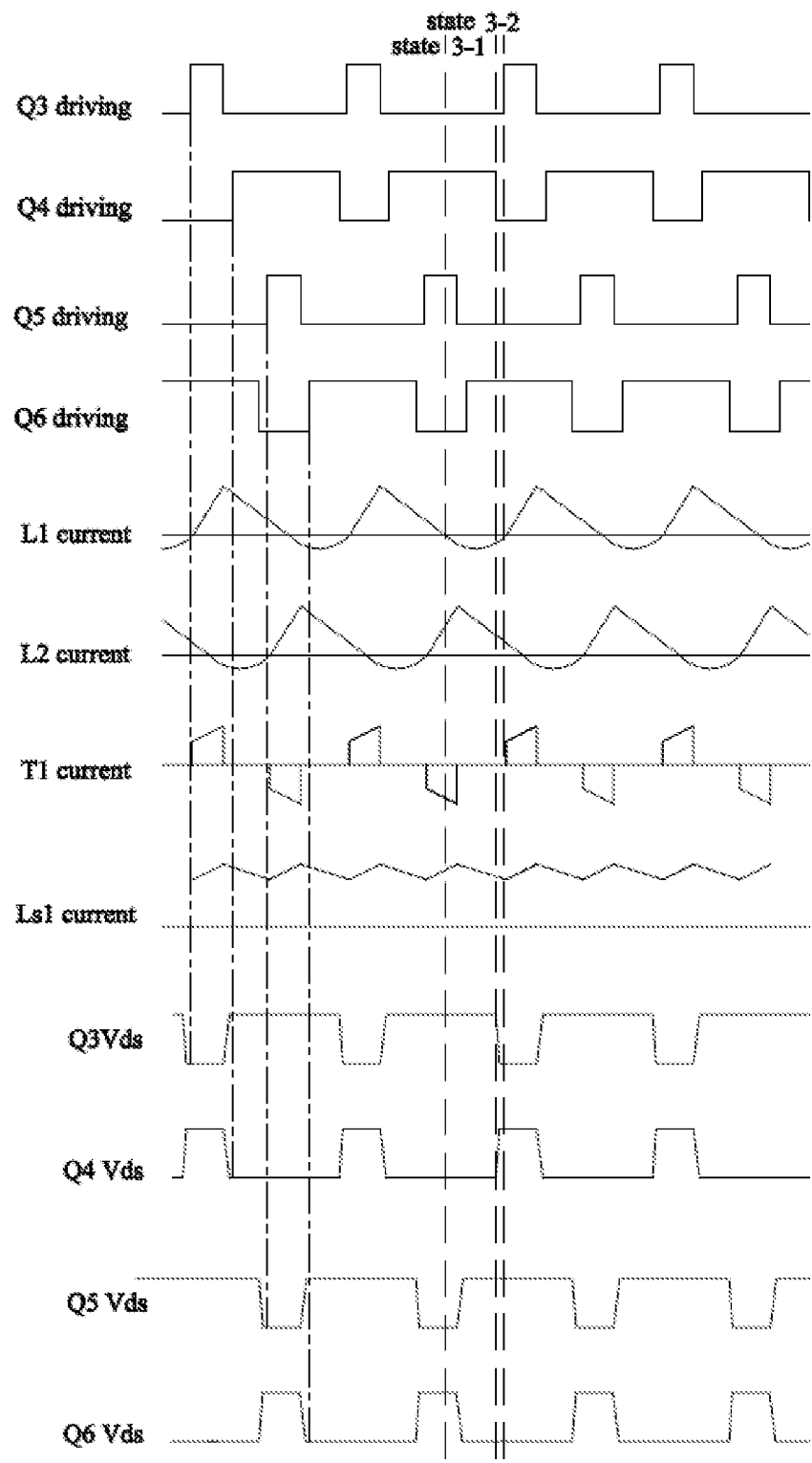
FIG. 20 is a diagram of waveform 1 in the second embodiment.

As shown in FIG. 20, in the operating waveform of the second embodiment, not only switching components Q4, Q5 but also Q3, Q5 operate at soft switching ZVS mode. Before Q3, Q4, Q5, Q6 turn on, their parasitic capacitors have been reversely discharged.

Figure 21:
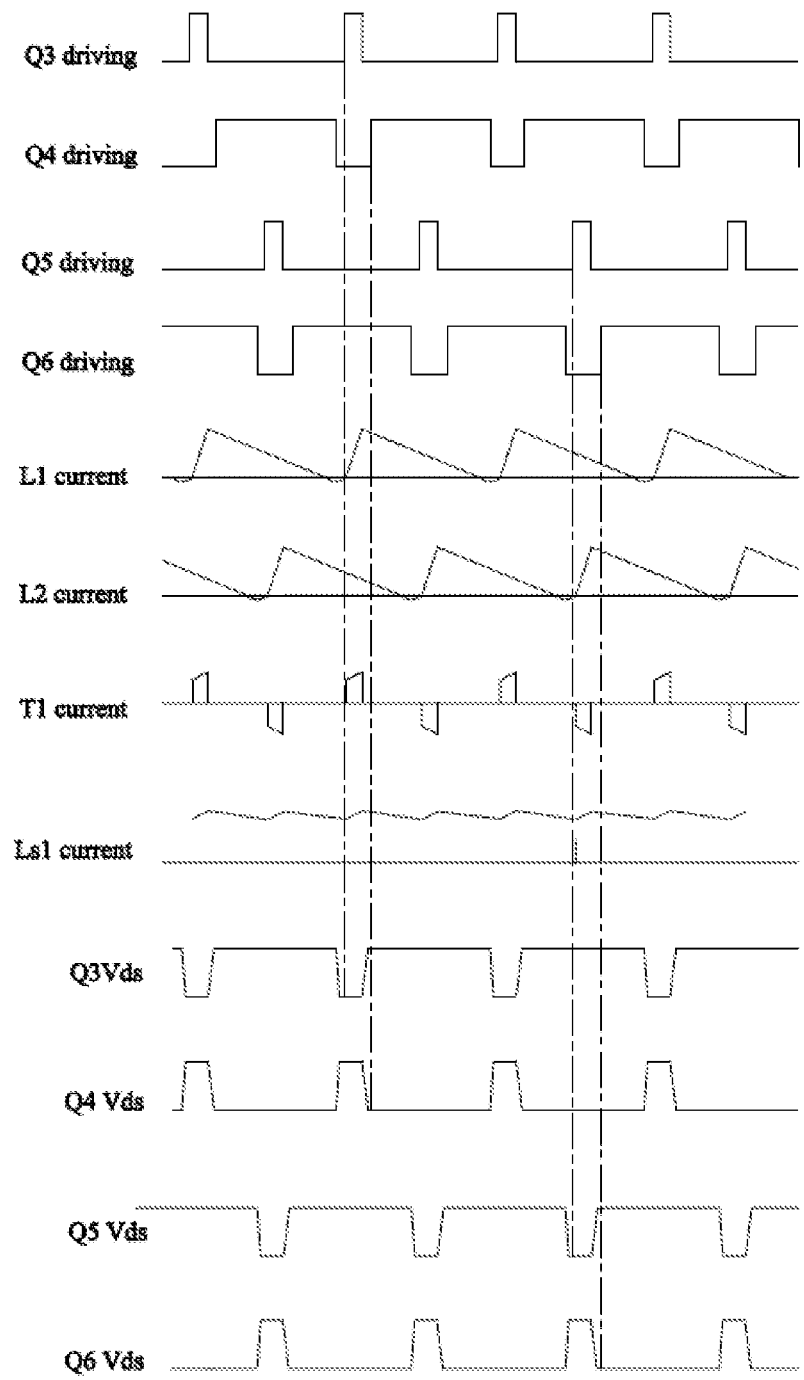
FIG. 21 is a diagram of waveform 2 in the second embodiment.

For the same reason as first embodiment, Duty(max) might be needed if input is at its high peak voltage. FIG. 21 shows the second embodiment's operating waveform at Duty(max) limitation mode.

Figure 22:
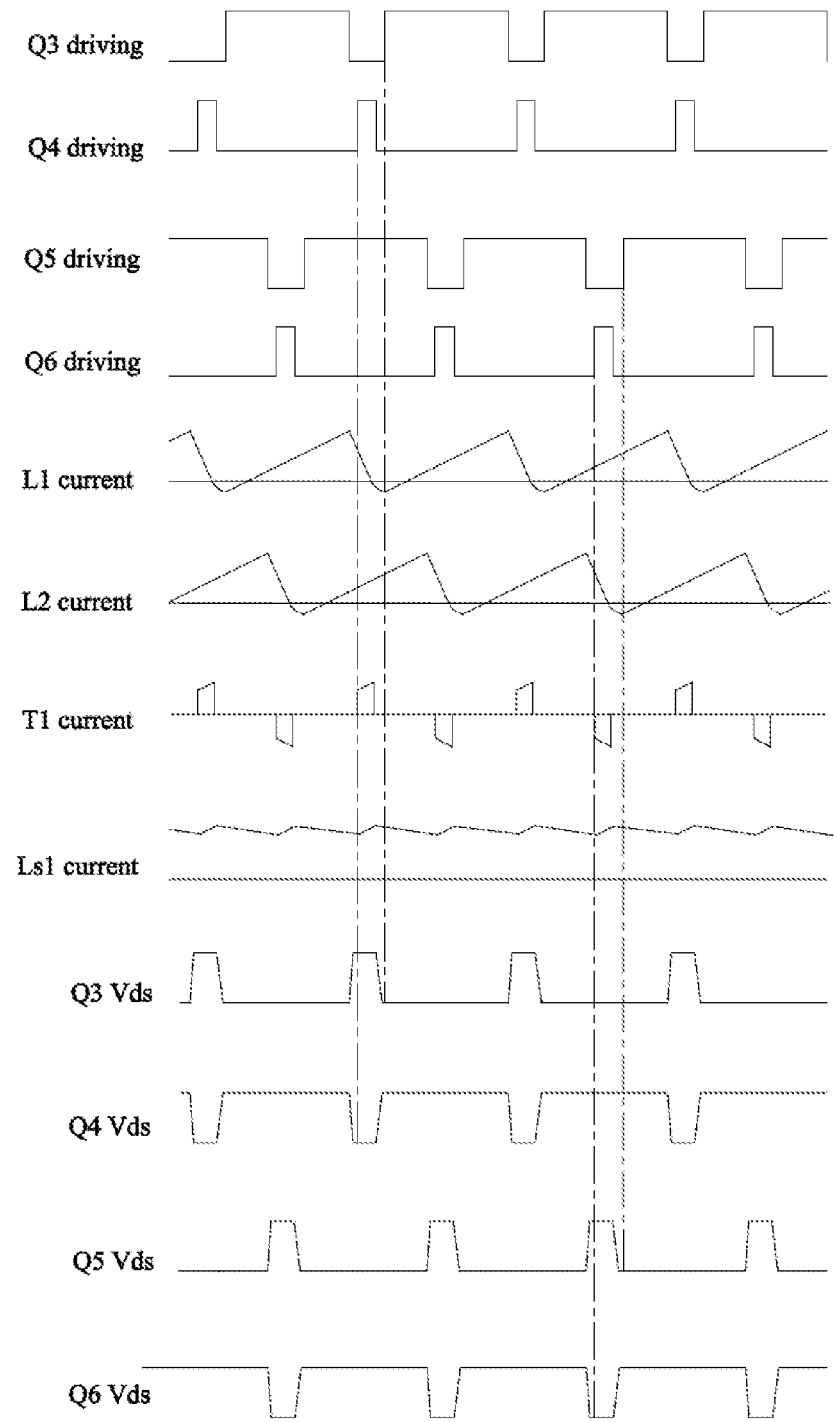
FIG. 22 is a diagram of waveform 3 in the second embodiment.

FIG. 22 is the second embodiment's operating waveform at forced maximum boost duty operating mode. At low input instant voltage condition, to prevent first inductor L1, second inductor L2 and boost capacitor C2's resonant current from reversing, maximum boost circuit duty is possibly required for it shortens off-time region which may lead to current resonance.

Figure 23:
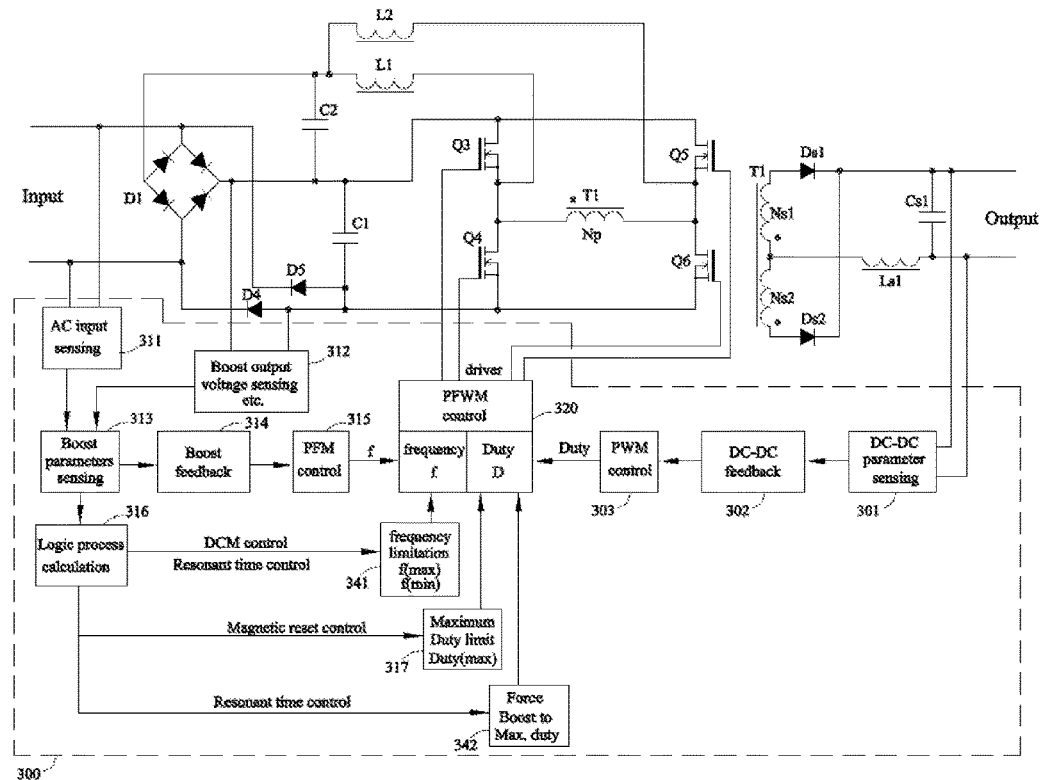
FIG. 23 shows control method 1 in the second embodiment.
Figure 24:
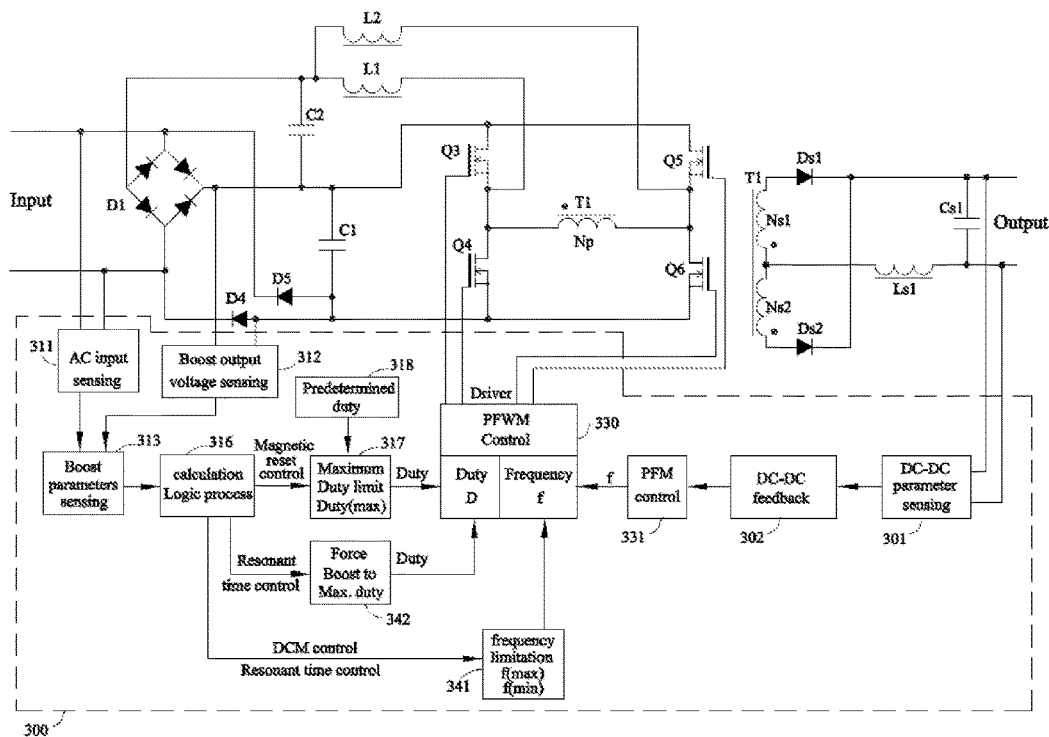
FIG. 24 shows control method 2 in the second embodiment.

FIG. 23 and FIG. 24 are first PFWM mode and second PFWM mode control diagrams in the second embodiment. Same as first embodiment, Duty(max) limitation 317 is to ensure magnetic reset of boost inductor L1 and L2.

The difference from first embodiment include: maximum frequency limitation 341 fmax is set to provide enough time for boost current returning to zero ampere, prevent L1, L2 from entering continuous current mode (CCM); The forced large boost duty 342 and lowest frequency limit 341, namely the control of resonance duration window, could prevent resonant current from reversing due to a too long resonance time. Above are the basis of soft switching in the second embodiment.

In addition, the difference from first embodiment include: first rectification component D1 changes to charge boost capacitor C2; first rectification component D1 and fourth rectification component D4 and fifth rectification component D5 change to charge storage capacitor C1. Because the charging to C1 occurs at only converter's turn-on, low cost, low current and small size rectification component could be chosen economically.

Third Embodiment

Figure 25:
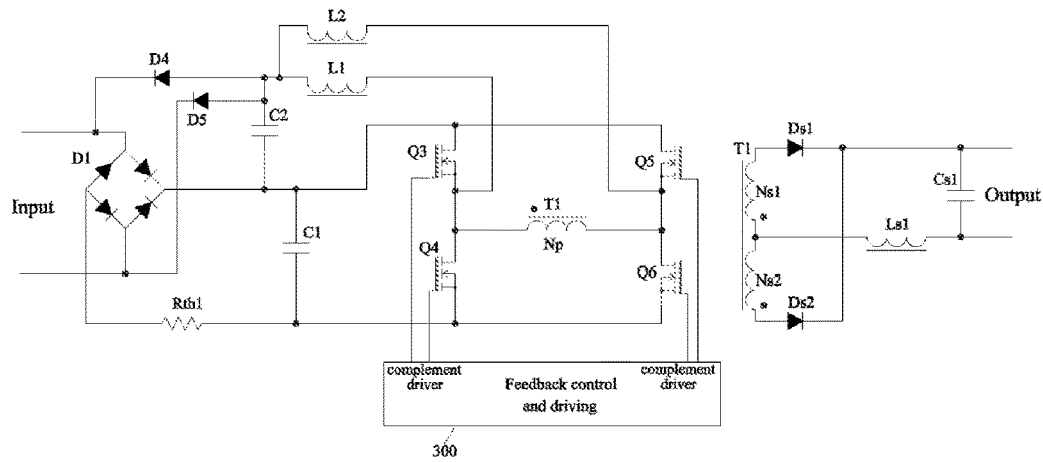
FIG. 25 is a schematic of third embodiment.

As shown in FIG. 25, between negative poles of storage capacitor C1 and first rectification component D1, an inrush current limiter device or circuit Rth1 is inserted to inhibit input surge current at turn-on of converter or EMC immunity test. Rth1 neither belongs to boost loop, nor belongs to second input rectification loop, so it only operates at power converter's turn-on. It is lossless after converter enters normal operation.

Operating principle is same as first embodiment (CCM) or second embodiment (DCM).

Fourth Embodiment

Figure 26:
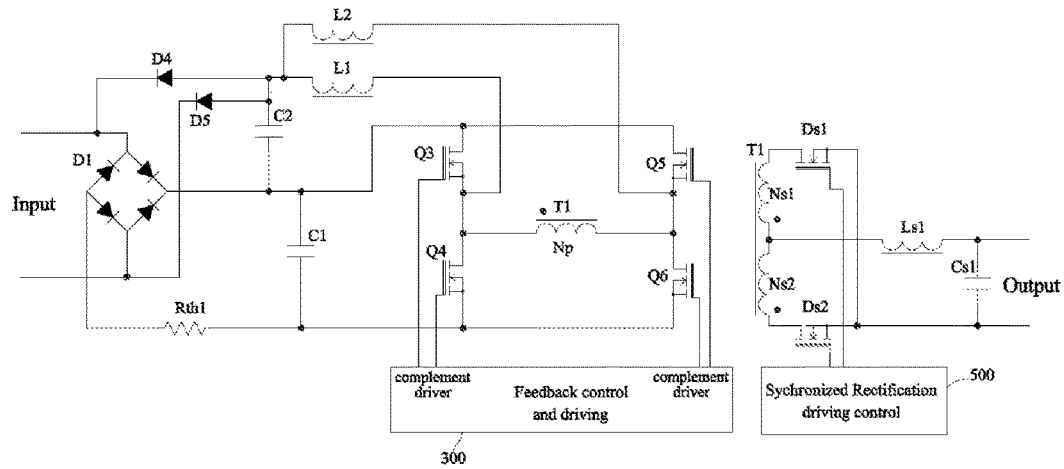
FIG. 26 is a schematic of fourth embodiment.

As shown in FIG. 26, the difference of the fourth embodiment from third embodiment is: output rectification components Ds1, Ds2 in full bridge DC-DC converter are replaced by switching components; using synchronous rectification control unit 500 to control conducting and cut-off states of DS1, DS2 like diodes, achieve synchronous rectification. As the result, the conducting loss of DS1 and DS2 is reduced.

Operating principle is same as first embodiment (CCM) or second embodiment (DCM).

Fifth Embodiment

Figure 27:
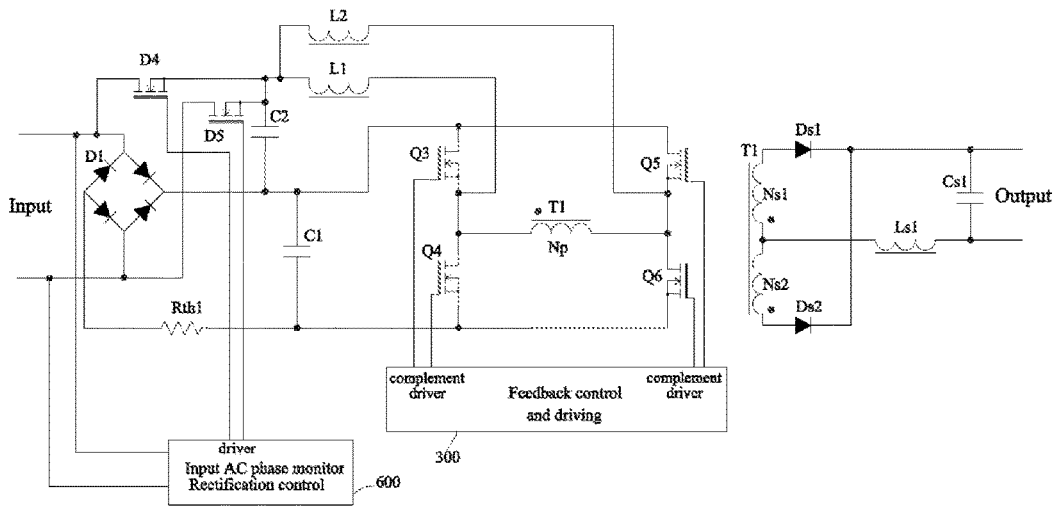
FIG. 27 is a schematic of fifth embodiment.

As shown in FIG. 27, the difference of the fifth embodiment from third embodiment is: input rectification components D4, D5 are replaced by switching components D4, D5; the switching components D4, D5 could be MOSFET, IGBT, GaN FET, SiC FET, etc. Benefiting from switching components' low conducting resistance, fifth embodiment could further improve efficiency.

Interleaved boost circuit and full bridge DC-DC converter operate in the same principle as first embodiment and second embodiment.

The part of the two input rectification circuits which charge storage capacitor C1 is same as that in the first embodiment.

Figure 28:
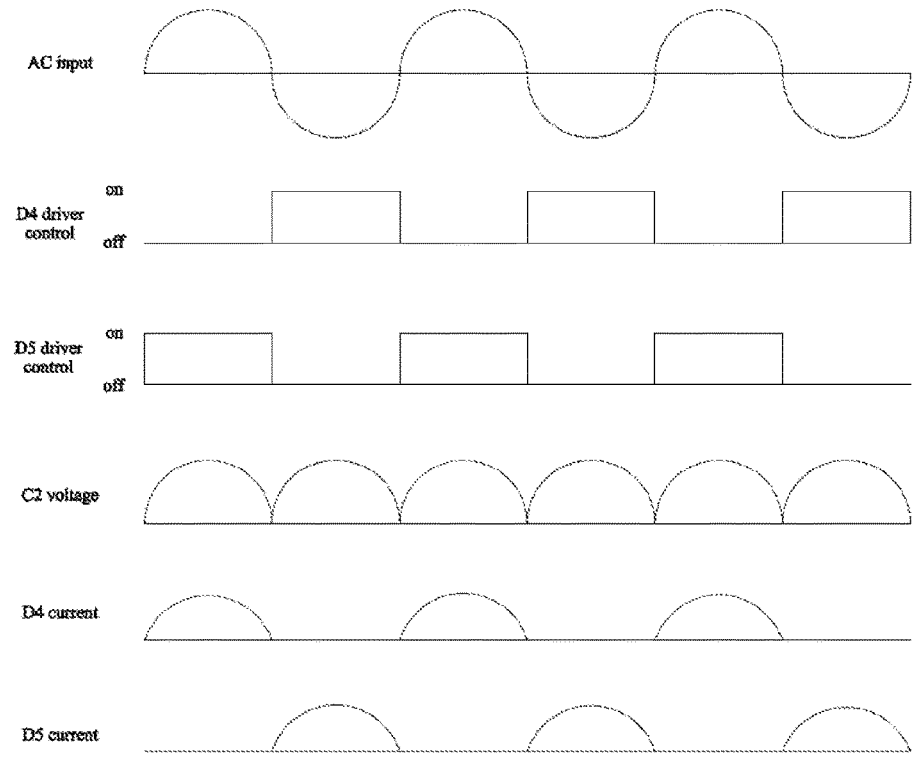
FIG. 28 is a diagram of the waveform of FIG. 27.

To charge boost capacitor C2, input AC phase monitoring and rectification control unit 600 monitors AC input voltage and/or phase, controls turn-on and cut off of switching components D4, D5, to realize a full-wave input rectification. D4 or D5 can be designed to conduct continuously during their half wave conduction interval. Due to no switching loss, its efficiency performance could possibly be better than bridgeless circuit. FIG. 28 shows waveform by using AC phase detection and rectification control unit 600. Setting appropriate and sufficient dead time between switching-on of D4, D5 could prevent input surge current from being shorted. The method in this embodiment could be implemented together with any embodiment from first to fourth embodiments.

Sixth Embodiment

Figure 29:
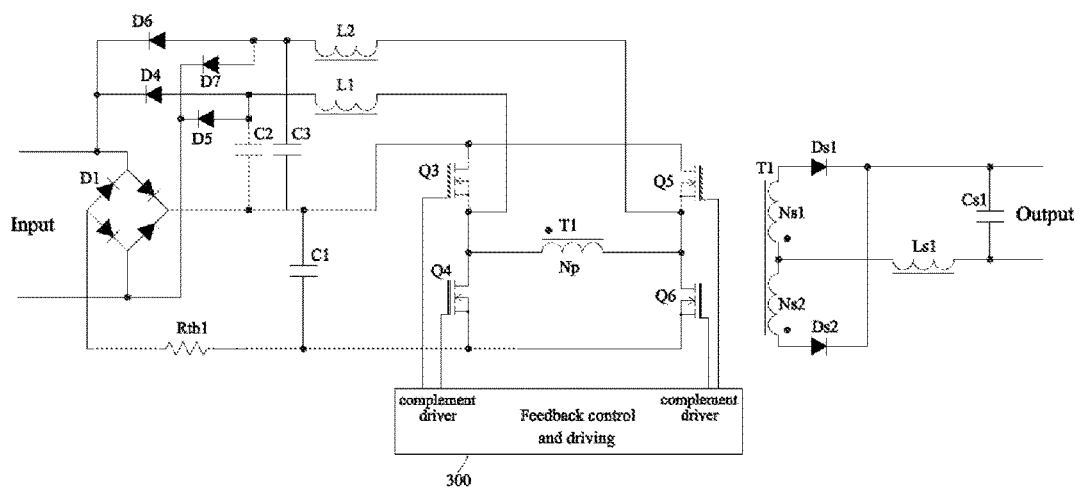
FIG. 29 is a schematic of sixth embodiment.

As shown in FIG. 29, the difference of the sixth embodiment from third embodiment is: the boost capacitor includes first boost capacitor C2 and second boost capacitor C3. First inductor L1 and second inductor L2 connect to first boost capacitor C2 and second boost capacitor C3 respectively. The sixth embodiment includes the third rectification circuit, which contains D1, D6 and D7. The third rectification circuit rectifies input AC voltage and charges second boost capacitor C3, forming the third rectification loop. Second rectification and third rectification circuits charge first boost capacitor C2 and second boost capacitor C3 respectively depends on input AC phase. Storage capacitor C1, and both boost capacitors C2, C3 connect at same polarity (in this example, they connect at positive nodes).

Operating principle is same as first embodiment (CCM) or second embodiment (DCM).

The interleaved boost circuit in this invention has good power factor harmonic correction performance thanks to its active boost conversion. By taking use of two switching components of full bridge converter, to alternately drive two boost inductors, it rewards with saving of two additional boost switching components, two boost rectifiers and individual PWM PFC control circuit in the conventional interleaved boost PFC circuit. Furthermore, by designing two boost inductors to operate at discontinuous mode, this circuit makes four switching components of full bridge converter operate at ZVS state to reduce switching loss. The dual-rectification circuits make it possible to allocate inrush current limiter at the appropriate position which inhibits inrush current at converter's turn-on only, but has no loss during subsequent normal operation. As a result, this circuit saves cost, saves space, increases efficiency and removes heat from converter so that low cost, compact, high efficiency power supply is achieved.

While the present invention has been shown and described in connection with the embodiments, it will be apparent to those skilled in the art that modifications and variations can be made without departing from the spirit and scopes of the invention as defined by appended claims.

What is claimed is:

1. A dual-rectification full bridge interleaved single stage PFC converter circuit, comprising: a first input rectification circuit, a second input rectification circuit, a storage capacitor, a boost capacitor, an interleaved boost converter, and a full bridge DC-DC converter, wherein the first input rectification circuit rectifies an input voltage and forms a first input rectification loop with the storage capacitor to charge the storage capacitor; the second input rectification circuit rectifies the input voltage and forms a second input rectification loop with the boost capacitor to charge the boost capacitor; one node of the storage capacitor, one node of the boost capacitor and an output of the first input rectification circuit are connected together at a same polarity;

wherein the full bridge DC-DC converter comprises:
a first bridge arm including a first switching component and a second switching component;
a second bridge arm including a third switching component and a fourth switching component;
a main transformer including at least one primary winding and at least one secondary winding, the at least one primary winding driven by the first bridge arm and the second bridge arm, the at least one secondary winding delivering power energy to an output load through a secondary rectification and filter circuit; and
a feedback control and driving unit that drives the first switching component, the second switching component, the third switching component and the fourth switching component, wherein the feedback and driving control unit senses and feedbacks an output of the full bridge DC-DC converter, generates a chopping signal to control the first through fourth switching components' conduction and cut-off by comparing with a setting value and according to automatic control theory, so as to control an output voltage, or output current, or output power of the full bridge DC-DC converter;

wherein the interleaved boost converter comprises the boost capacitor and a boost circuit, the boost circuit comprising a first inductor, a second inductor, the first switching component, the second switching component, the third switching component and the fourth switching component;

wherein during conduction of the first switching component, the first inductor, the boost capacitor and the first switching component form a first boost loop that charges the first inductor with energy stored in the boost capacitor; and during cut-off of the first switching component, the first inductor, the boost capacitor, the second switching component and the storage capacitor form a second boost loop that charges the storage capacitor by a superimposed voltage of an induced voltage on the first inductor and a voltage on the boost capacitor;

wherein during conduction of the third switching component, the second inductor, the boost capacitor and the third switching component form a third boost loop that charges the second inductor with energy stored in the boost capacitor; and during cut-off of the third switching component, the second inductor, the boost capacitor, the fourth switching component and the storage capacitor form a fourth boost loop that charges the storage capacitor by a superimposed voltage of an induced voltage on the second inductor and the voltage on the boost capacitor;

wherein during conduction of the first switching component, the superimposed voltage which serves as a boost output voltage charges the primary winding of the main transformer to form a first DC-DC loop; and during conduction of the third switching component, the superimposed voltage which serves as the boost output voltage charges the primary winding of the main transformer to form a second DC-DC loop;

wherein the first switching component and the third switching component alternately conduct.

2. The dual-rectification full bridge interleaved single stage PFC converter circuit according to claim 1, wherein the first inductor and the second inductor operate at discontinuous current mode;

when the first or second inductor's current is discharged to zero, a resonant loop comprising the storage capacitor, the boost capacitor, the first or second inductor, and the second or fourth switching component which is in a turn-on state, generates a resonant current; upon turn-off of the second or fourth switching component, the resonant current changes direction to discharge a parasitic capacitor of the first or third switching component until a zero voltage is substantially reached, to enable the first or third switching component to achieve zero voltage switching (ZVS) at a subsequent turn-on.

3. The dual-rectification full bridge interleaved single stage PFC converter circuit according to claim 1, wherein each of the first input rectification circuit and the second input rectification circuit comprises at least a rectification component, the rectification component being a diode or a switching component; when the rectification component is a switching component, the dual-rectification full bridge interleaved single stage PFC converter further comprises an input AC phase monitoring and rectification control unit that controls turn-on and turn-off of the switching component according to polarity or phase of an AC input.

4. The dual-rectification full bridge interleaved single stage PFC converter circuit according to claim 1, wherein the boost capacitor comprises a first boost capacitor and a second boost capacitor; the dual-rectification full bridge interleaved single stage PFC converter further comprises a third rectification circuit which rectifies an AC input voltage, and forms together with the second boost capacitor a third input rectification loop to charge the second boost capacitor; the second input rectification circuit and the first boost capacitor form the second input rectification loop to charge the first capacitor.

5. The dual-rectification full bridge interleaved single stage PFC converter circuit according to claim 1, further comprising: an impedance circuit coupled in series to the first input rectification loop, to limit an input inrush current upon turn-on of power supply, the impedance circuit neither coupled to the second input rectification loop, nor coupled to the first, second, third or fourth boost loop.

6. A PFWM control method for the dual-rectification full bridge interleaved single stage PFC converter circuit according to claim 1, comprising:

sensing and feedbacking an output parameter among voltage, current or power of a full bridge DC-DC converter, comparing the output parameter to a setting value and calculating a frequency of a PFM chopping signal according to a feedback automatic control theory;

obtaining a predetermined operating duty that ensures complete magnetic reset of a boost inductor at certain input AC peak voltage condition; and combining the frequency of the PFM chopping signal and the predetermined operating duty to form at least a pair of complementary PFWM driving signals, the PFWM driving signals configured to drive a first through a fourth switching components of the full bridge DC-DC converter, so as to adjust an output voltage of an interleaved boost converter by the frequency and adjust an output of the full bridge DC-DC converter according to the predetermined duty.

7. The PFWM control method according to claim 6, further comprising:

monitoring an input AC instant voltage and a boost output voltage, obtaining a maximum duty to prevent saturation of a first and a second inductor caused by an insufficient magnetic reset;

constraining the duty of the PFWM driving signal by selecting a smaller one of the maximum duty and the predetermined duty as an operating duty to ensure complete magnetic reset of the first and second inductors.

8. The PFWM control method according to claim 6, further comprising:

monitoring an input AC instant voltage, and setting a maximum operating frequency dynamically according to the input AC instant voltage.

9. The PFWM control method according to claim 6, further comprising:

monitoring an input AC instant voltage, forcing the interleaved boost convertor to operate at the maximum duty dynamically according to the input AC instant voltage, or simultaneously setting a minimum operating frequency.

10. A PFWM control method for the dual-rectification full bridge interleaved single stage PFC converter circuit according to claim 1, comprising:

sensing and feedbacking a first output parameter among voltage, current or power of an interleaved boost convertor, comparing the first output parameter to a first setting value and obtaining a frequency of a PFM chopping signal according to a feedback control theory;

sensing and feedbacking a second output parameter among voltage, current or power of a full bridge DC-DC converter, comparing the second output parameter to a second setting value and obtaining a duty of a PWM chopping signal according to an automatic control theory;

obtaining a predetermined duty according to the obtained duty of the PWM chopping signal; and combining the obtained frequency of the PFM chopping signal and the predetermined duty of the PWM chopping signal to form at least a pair of complementary PFWM driving signals, wherein the PFWM driving signals are configured to drive a first through a fourth switching components of the full bridge DC-DC converter, so as to adjust an output of the interleaved boost converter by the frequency, and control an output of the full bridge DC-DC converter by the duty.

11. The PFWM control method according to claim 10, further comprising:
monitoring an input AC instant voltage and a boost output voltage, obtaining a maximum duty to prevent saturation of a first and a second inductor caused by an insufficient magnetic reset;
constraining the duty of the PFWM driving signal by selecting a smaller one of the maximum duty and the predetermined duty as an operating duty to ensure complete magnetic reset of the first and second inductors.

12. The PFWM control method according to claim 10, further comprising:
monitoring an input AC instant voltage, and setting a maximum operating frequency dynamically according to the input AC instant voltage.

13. The PFWM control method according to claim 10, further comprising:
monitoring an input AC instant voltage, forcing the interleaved boost convertor to operate at the maximum duty dynamically according to the input AC instant voltage, or simultaneously setting a minimum operating frequency.

* * * * *